US010470017B2

(12) United States Patent
Lu et al.

(10) Patent No.: US 10,470,017 B2
(45) Date of Patent: Nov. 5, 2019

(54) IDENTITY INFORMATION PROCESSING METHOD, DATABASE CONTROL SYSTEM, AND RELATED DEVICE

(71) Applicant: HUAWEI TECHNOLOGIES CO., LTD., Shenzhen, Guangdong (CN)

(72) Inventors: Wei Lu, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/291,521

(22) Filed: Mar. 4, 2019

(65) Prior Publication Data
US 2019/0200197 A1    Jun. 27, 2019

Related U.S. Application Data

(63) Continuation of application No. PCT/CN2016/098064, filed on Sep. 5, 2016.

(51) Int. Cl.
*H04W 4/60*    (2018.01)
*H04L 29/08*    (2006.01)
(Continued)

(52) U.S. Cl.
CPC .......... *H04W 4/60* (2018.02); *H04L 61/1588* (2013.01); *H04L 67/20* (2013.01); *H04W 8/20* (2013.01);
(Continued)

(58) Field of Classification Search
CPC ... H04W 88/02; H04W 28/0215; H04W 8/04; H04W 4/60; H04W 8/24; H04L 67/20;
(Continued)

(56) References Cited

U.S. PATENT DOCUMENTS 7,610,619 B2 * 10/2009 Kastelewicz ......... H04W 12/06
                                                      726/10
8,027,666 B2 * 9/2011 Xie ......................... H04L 63/08
                                                   370/310.2

(Continued)

FOREIGN PATENT DOCUMENTS

CN        102238534 A     11/2011
CN        102780999 A     11/2012
(Continued)

OTHER PUBLICATIONS

3GPP TS 23.682 V135.0 (Mar. 2016), 3rd Generation Partnership Project; Technical Specification Group Services and System Aspects; Architecture enhancements to facilitate communications with packet data networks and applications (Release 13), Mar. 2016, 90 pages.
(Continued)

*Primary Examiner* — Nizar N Sivji
(74) *Attorney, Agent, or Firm* — Fish & Richardson P.C.

(57) ABSTRACT

Embodiments of this application provide an identity information processing method, a database control system, a service capability exposure function, and a home subscriber server, so as to dynamically establish a correspondence between external identity information and intra-network identity information, thereby simplifying an operation process of establishing the correspondence. In this way, the correspondence between the external identity information and the intra-network identity information is dynamically established, so as to reduce correspondence establishment complexity.

12 Claims, 9 Drawing Sheets

(51) Int. Cl.
  *H04W 8/20* (2009.01)
  *H04L 29/12* (2006.01)
  *H04W 88/16* (2009.01)
(52) U.S. Cl.
  CPC ......... *H04L 61/6054* (2013.01); *H04W 88/16* (2013.01)
(58) Field of Classification Search
  CPC ......... H04L 9/14; H04L 63/083; H04L 63/10; H04L 65/1073; H04L 47/20; H04L 65/1063; H04L 9/3271; H04L 45/745; H04L 63/062; H04L 63/0807; G06F 21/31; G06F 2221/0775
  See application file for complete search history.

(56) References Cited

U.S. PATENT DOCUMENTS

| | | | |
|---|---|---|---|
| 2002/0035699 A1* | 3/2002 | Crosbie | H04L 63/10 726/12 |
| 2009/0177782 A1* | 7/2009 | Blatherwick | H04L 29/12094 709/228 |
| 2014/0357300 A1 | 12/2014 | Hao et al. | |
| 2015/0163655 A1 | 6/2015 | Yang et al. | |
| 2016/0065563 A1* | 3/2016 | Broadbent | H04L 63/0281 726/9 |
| 2018/0139797 A1* | 5/2018 | Chun | H04W 60/04 |

FOREIGN PATENT DOCUMENTS

| | | |
|---|---|---|
| CN | 102857908 A | 1/2013 |
| CN | 103067857 A | 4/2013 |
| EP | 2605565 A2 | 6/2013 |
| EP | 3422752 A1 | 1/2019 |

OTHER PUBLICATIONS

Partial Supplementary European Search Report issued in European Application No. 16914661.0 dated Apr. 25, 2019, 17 pages.
International Search Report and Written Opinion issued in International Application No. PCT/CN2016/098064 dated May 31, 2017, 18 pages.

* cited by examiner

IDENTITY INFORMATION PROCESSING METHOD, DATABASE CONTROL SYSTEM, AND RELATED DEVICE

CROSS-REFERENCE TO RELATED APPLICATIONS

This application is a continuation of International Application No. PCT/CN2016/098064, filed on Sep. 5, 2016, the disclosure of which is hereby incorporated by reference in its entirety.

TECHNICAL FIELD

This application relates to the field of communications technologies, and in particular, to an identity information processing method, a database control system, a service capability exposure function, a home subscriber server, and a communications system.

BACKGROUND

In the era of mobile Internet, operators are continuously seeking for a technical manner of exposing a teleservice capability and integrating the teleservice capability into an Internet service, to develop a new service mode and a source of revenue.

In a communications network that includes a third-party application server and a service capability exposure function SCEF, a 3GPP network device usually uses the service capability exposure function SCEF to securely provide a third-party application server with a key function device for service capability exposure in a 3GPP communications network.

According to a current standard, the third-party application identifies UE by using an external identity (External identity). However, a correspondence between the external identity and a UE identity IMSI/MSISDN needs to be subscribed in an HSS for the identity. Therefore, when the third-party application performs a monitoring event, a third-party application SCS/AS requests network information from a related 3GPP device by using the SCEF, and a 3GPP network element device determines UE identity information (an IMSI/MSISDN value) based on the subscribed correspondence, to obtain network information that is in a 3GPP network and that is of a UE corresponding to the UE identity information.

Through research on the prior art, the inventor of this application finds that the prior art has the following problems:

In the prior art, a correspondence between an external identity information and an IMSI/MSISDN needs to be subscribed in a subscription database in advance for each UE. Consequently, a subscription process is complex, maintenance is inconvenient when a data volume is large, and load of the subscription database is increased.

SUMMARY

Embodiments of this application provide an identity information processing method, a database control system, a service capability exposure function, and a home subscriber server, so as to dynamically establish a correspondence between external identity information and intra-network identity information.

A first aspect of the embodiments of this application provides an identity information processing method, including:

After a third-party application server receives an IP address of UE and allocates external identity information to the UE, a database control system obtains registration information sent by the third-party application server. The registration information includes the IP address and the external identity information that are corresponding to each other, in other words, the IP address and the external identity information belong to same UE. The external identity information is allocated by the third-party application server to a UE, and the external identity information is used to identify the UE in an external device of a communications network, for example, the third-party application server.

After the database control system obtains the IP address in the registration information, the database control system sends the IP address to a target network element, so that the target network element can perform corresponding processing based on the IP address.

The database control system receives intra-network identity information from the target network element. The intra-network identity information is obtained by the target network element based on the IP address, the intra-network identity information may be information used to uniquely identify a terminal in the communications network, for example, may be an IMSI/MSISDN or a private IP address. The corresponding terminal may be determined by using the intra-network identity information, the intra-network identity information may be stored in the target network element, and the target network element may find the corresponding intra-network identity information by using the obtained IP address.

After the database control system obtains the intra-network identity information, the database control system establishes a correspondence between the external identity information and the intra-network identity information.

In the solution provided in this embodiment of this application, the database control system may establish the correspondence between the external identity information and the intra-network identity information by obtaining the external identity information from the third-party application server and obtaining the intra-network identity information from the target network element. In this way, the correspondence between the external identity information and the intra-network identity information is dynamically established, so as to reduce correspondence establishment complexity compared with the prior art.

Optionally, there may be the following possible implementations of sending, by the database control system, the IP address to the target network element and receiving intra-network identity information from the target network element.

With reference to the first aspect of the embodiments of this application, in a first implementation of the first aspect of the embodiments of this application, the target network element includes a PGW, and the intra-network identity information includes an IMSI/MSISDN. Information stored in the PGW includes the IMSI/MSISDN, and therefore, the IMSI/MSISDN, of the UE, that is corresponding to the IP address may be obtained from the PGW.

Optionally, with reference to the first implementation of the first aspect of the embodiments of this application, in a second implementation of the first aspect of the embodiments of this application, when the IP address is a public IP address, the method further includes: Because the PGW is both an entrance from which an external network sends data to the UE and a device that is responsible for allocating the IP address to the UE, after the PGW receives the public IP address sent by the database control system, the PGW obtains a private IP address based on the public IP address; the PGW obtains the IMSI/MSISDN based on the private IP address; and the PGW sends the IMSI/MSISDN to the database control system. Alternatively, when the IP address is a private IP address, the method further includes: The PGW receives the private IP address sent by the database control system; the PGW obtains the IMSI/MSISDN based on the private IP address; and the PGW sends the IMSI/MSISDN to the database control system.

Optionally, with reference to the first aspect of the embodiments of this application, in a third implementation of the first aspect of the embodiments of this application, the target network element includes a MEC, the MEC is provided with a NAT function, the IP address is a public IP address, the intra-network identity information includes a private IP address, and the database control system obtains the private IP address from the MEC. The private IP address is obtained by the MEC based on the public IP address. Because the MEC stores the private IP address of the UE, the database control system may obtain, from the MEC, the private IP address, of the UE, that is corresponding to the public IP address, to establish the correspondence between the external identity information and the private IP address.

Optionally, with reference to the third implementation of the first aspect of the embodiments of this application, in a fourth implementation of the first aspect of the embodiments of this application, after the database control system establishes the correspondence between the external identity information and the intra-network identity information, the method further includes:

The database control system receives a deletion request sent by the third-party application server, and the deletion request is generated by the third-party application server when a terminal corresponding to the private IP address exits the third-party application server.

The database control system deletes the correspondence between the external identity information and the private IP address in the intra-network identity information according to the deletion request. A different private IP address may be assigned to the UE each time the UE accesses a network. To update in time the correspondence between the external identity information and the private IP address in the database control system, the third-party application server may generate the deletion request after the third-party application server detects that the UE exits the third-party application server, to instruct the database control system to delete the correspondence between the external identity information and the private IP address of the UE.

Optionally, with reference to any one of the first aspect, or the first to the fourth implementations of the first aspect of the embodiments of this application, in a fifth implementation of the first aspect of the embodiments of this application, after the database control system establishes the correspondence between the external identity information and the intra-network identity information, the method further includes: The database control system receives external identity information sent by a preset network element, in other words, after the database control system completes establishment of the correspondence between the external identity information and the intra-network identity information, the database control system may receive external identity information sent by another network element. In this way, the database control system may determine, based on the correspondence between the external identity information and the intra-network identity information, an IMSI/MSISDN that is corresponding to the external identity information sent by the preset network element. Then, the database control system sends the determined IMSI/MSISDN to the preset network element. In this way, the database control system may provide a related network element with the intra-network identity information by using the established correspondence between the external identity information and the intra-network identity information.

Optionally, the preset network element in the fifth implementation includes an HSS, an SCEF, or a MEC.

Optionally, with reference to the first implementation of the first aspect of the embodiments of this application, in a sixth implementation of the first aspect of the embodiments of this application, when the database control system obtains the intra-network identity information from the PGW, the database control system obtains, from the PGW, an identity IP address corresponding to the intra-network identity information. The identity IP address is determined by the PGW based on the IP address, so that the IP address is associated with the identified IP address. After the database control system obtains the identified IP address, the database control system establishes a correspondence between the external identity information and an IMSI/MSISDN based on the IP address sent by the third-party application server and the identity IP address sent by the PGW. The IP address and the external identity information that are in the registration information sent by the third-party application server are corresponding to each other, and the intra-network identity information and the identity IP address that are sent by the PGW are corresponding to each other. Because the identity IP address is determined by the PGW based on the IP address, the correspondence between the external identity information and the IMSI/MSISDN may be conveniently established by using the association between the IP address and the identity IP address without requiring other information, thereby improving correspondence establishment efficiency.

Optionally, based on the sixth implementation, the method in this embodiment of this application further includes: A correspondence between the external identity information, the IP address and/or the identity IP address, and the IMSI/MSISDN is established by using the association between the IP address and the identity IP address, so that the correspondence includes richer content to provide more services for other network elements.

A second aspect of the embodiments of this application provides an identity information processing method, including:

When a third-party application server needs to perform a monitoring event on UE in the third-party application server, a service capability exposure function SCEF receives a first monitoring request sent by the third-party application server. The first monitoring request includes external identity information and monitoring type information, the monitoring type information is used to indicate a type of the monitoring event of the third-party application server, and the UE corresponding to the monitoring event in the monitoring type information is the same as UE corresponding to the external identity information.

The SCEF sends the external identity information to a database control system.

The SCEF receives intra-network identity information sent by the database control system, and the intra-network identity information is obtained by the database control system from a pre-established correspondence between the external identity information and the intra-network identity information based on the external identity information sent by the SCEF.

After the SCEF obtains the intra-network identity information, the SCEF sends a second monitoring request to an HSS, and the second monitoring request includes the intra-network identity information and the monitoring type information, so that after determining a corresponding MME based on the intra-network identity information, the HSS requests, from the MME, monitoring event information corresponding to the monitoring type information.

In the solution provided in this embodiment of this application, the SCEF may obtain the intra-network identity information from the database control system, to perform the monitoring request initiated by the third-party application server. However, in the prior art, the SCEF obtains the intra-network identity information from subscription data of the HSS. In the method in this embodiment of this application, the correspondence between the intra-network identity information and the external identity information is stored in the database control system instead of the HSS, so as to reduce data maintenance of the HSS and the like.

Optionally, with reference to the second aspect of the embodiments of this application, the intra-network identity information includes an IMSI or an MSISDN. The IMSI or the MSISDN in the intra-network identity information for communication may identify the UE. The SCEF obtains the IMSI or the MSISDN, and sends the IMSI or the MSISDN to the HSS, so that the HSS can determine, based on the IMSI or the MSISDN, the MME in which the UE is located, to request the MME to perform the monitoring request initiated by the third-party application server.

A third aspect of the embodiments of this application provides an identity information processing method, including:

After a third-party application server initiates a monitoring event to UE in the third-party application server to send a monitoring request to an SCEF, and the SCEF obtains external identity information and monitoring type information, the SCEF sends a monitoring request to an HSS, and the HSS obtains the external identity information and the monitoring type information from the SCEF.

The HSS sends the external identity information to a database control system.

The HSS receives intra-network identity information sent by the database control system, and the intra-network identity information is obtained by the database control system from a pre-established correspondence between the external identity information and the intra-network identity information based on the external identity information sent by the HSS.

Because an MME may process the monitoring event initiated by the third-party application server, the HSS determines the MME based on the intra-network identity information.

The HSS requests, from the MME, monitoring event information corresponding to the monitoring type information, so that the MME can process the monitoring event initiated by the third-party application server.

In the identity information processing method in this embodiment of this application, after obtaining the external identity information and the monitoring type information, the HSS may send the external identity information to the database control system that pre-establishes the correspondence between the external identity information and the intra-network identity information, so that the database control system returns the corresponding intra-network identity information IMSI/MSISDN. The HSS determines the MME based on the IMSI/MSISDN, and initiates, to the MME, the monitoring request corresponding to the monitoring type information. The HSS may obtain the IMSI/MSISDN from the database control system. However, in the prior art, the HSS obtains the IMSI/MSISDN from subscription data of the HSS. In the method in this embodiment of this application, the correspondence between the intra-network identity information IMSI/MSISDN and the external identity information is stored in the database control system, so as to reduce data maintenance of the HSS and the like.

Optionally, with reference to the third aspect of the embodiments of this application, the intra-network identity information includes an IMSI or an MSISDN. The IMSI or the MSISDN in the intra-network identity information for communication may identify the UE. The HSS obtains the IMSI or the MSISDN, so that the HSS can determine, based on the IMSI or the MSISDN, the MME in which the UE is located, to request the MME to perform the monitoring request initiated by the third-party application server.

A fourth aspect of the embodiments of this application provides a database control system, where the database control system has functions of the foregoing database control system. The functions may be implemented by using hardware, or may be implemented by executing corresponding software by hardware. The hardware or the software includes one or more modules corresponding to the functions.

In a possible implementation, the database control system includes:

a first receiving unit, configured to receive registration information sent by a third-party application server, where the registration information includes an IP address of UE and external identity information of the UE, and the external identity information is allocated by the third-party application server to the UE;

a first sending unit, configured to send the IP address to a target network element, where the first receiving unit is further configured to receive intra-network identity information of the UE that is returned by the target network element based on the IP address; and a first processing unit, configured to establish a correspondence between the external identity information and the intra-network identity information.

In another possible implementation, the database control system includes:

a transceiver and a processor, where the transceiver performs the following action: receiving registration information sent by a third-party application server, where the registration information includes an IP address and external identity information that are corresponding to each other, and the external identity information is allocated by the third-party application server to a UE;

the transceiver further performs the following action: sending the IP address to a target network element;

the transceiver further performs the following action: receiving intra-network identity information sent by the target network element, where the intra-network identity information is obtained by the target network element based on the IP address; and the processor performs the following action: establishing a correspondence between the external identity information and the intra-network identity information.

A fifth aspect of the embodiments of this application provides a service capability exposure function, where the service capability exposure function has functions of the foregoing database control system. The functions may be implemented by using hardware, or may be implemented by executing corresponding software by hardware. The hardware or the software includes one or more modules corresponding to the functions.

In a possible implementation, the service capability exposure function includes:

a third receiving unit, configured to receive a first monitoring request sent by a third-party application server, where the first monitoring request includes external identity information and monitoring type information; and a third sending unit, configured to send the external identity information to a database control system, where the third receiving unit is configured to receive intra-network identity information sent by the database control system, where the intra-network identity information is obtained by the database control system from a pre-established correspondence between the external identity information and the intra-network identity information based on the external identity information sent by the SCEF; and the third sending unit is configured to send a second monitoring request to an HSS, where the second monitoring request includes the intra-network identity information and the monitoring type information, so that after determining a corresponding MME based on the intra-network identity information, the HSS requests, from the MME, monitoring event information corresponding to the monitoring type information.

In another possible implementation, the service capability exposure function includes:

a transceiver and a processor, where the transceiver performs the following action: receiving a first monitoring request sent by a third-party application server, where the first monitoring request includes external identity information and monitoring type information;

the transceiver further performs the following action: sending the external identity information to a database control system;

the transceiver further performs the following action: receiving intra-network identity information sent by the database control system, where the intra-network identity information is obtained by the database control system from a pre-established correspondence between the external identity information and the intra-network identity information based on the external identity information sent by the SCEF; and the transceiver further performs the following action: sending a second monitoring request to an HSS, where the second monitoring request includes the intra-network identity information and the monitoring type information, so that after determining a corresponding MME based on the intra-network identity information, the HSS requests, from the MME, monitoring event information corresponding to the monitoring type information.

A sixth aspect of the embodiments of this application provides a home subscriber server, where the home subscriber server has functions of the foregoing database control system. The functions may be implemented by using hardware, or may be implemented by executing corresponding software by hardware. The hardware or the software includes one or more modules corresponding to the functions.

In a possible implementation, the home subscriber server includes:

a fourth receiving unit, configured to receive external identity information and monitoring type information that are sent by an SCEF;

a fourth sending unit, configured to send the external identity information to a database control system, where the fourth receiving unit is configured to receive intra-network identity information sent by the database control system, where the intra-network identity information is obtained by the database control system from a pre-established correspondence between the external identity information and the intra-network identity information based on the external identity information sent by the fourth sending unit; and a fourth processing unit, configured to determine an MME based on the intra-network identity information, where the fourth sending unit is configured to request, from the MME, monitoring event information corresponding to the monitoring type information.

In another possible implementation, the home subscriber server includes:

a transceiver and a processor, where the transceiver performs the following action: receiving external identity information and monitoring type information that are sent by an SCEF;

the transceiver further performs the following action: sending the external identity information to a database control system;

the transceiver further performs the following action: receiving intra-network identity information sent by the database control system, where the intra-network identity information is obtained by the database control system from a pre-established correspondence between the external identity information and the intra-network identity information based on the external identity information sent by the transceiver;

the processor performs the following action: determining an MME based on the intra-network identity information; and the transceiver further performs the following action: requesting, from the MME, monitoring event information corresponding to the monitoring type information.

A seventh aspect of the embodiments of this application provides a computer storage medium, where the computer storage medium stores program code, and the program code is used to instruct to perform the method in the first aspect.

An eighth aspect of the embodiments of this application provides a computer storage medium, where the computer storage medium stores program code, and the program code is used to instruct to perform the method in the second aspect.

A ninth aspect of the embodiments of this application provides a computer storage medium, where the computer storage medium stores program code, and the program code is used to instruct to perform the method in the third aspect.

A tenth aspect of the embodiments of this application provides a communications system. In a first possible implementation of the tenth aspect, the communications system includes a database control system, a target network element, and a third-party application server. The database control system is the database control system in the fourth aspect, and the database control system may be configured to implement functions of the database control system in the first aspect.

Optionally, with reference to the first possible implementation of the tenth aspect, in a second implementation, the target network element includes a PGW or a MEC.

Optionally, with reference to the first possible implementation of the tenth aspect, in a third implementation, the communications system further includes a service capability exposure function and a home subscriber server.

The service capability exposure function is the service capability exposure function in the fifth aspect, and the service capability exposure function may be configured to implement functions of the service capability exposure function in the second aspect.

The home subscriber server is the home subscriber server in the sixth aspect, and the home subscriber server may be configured to implement functions of the home subscriber server in the third aspect.

The embodiments of this application have the following advantages:

The database control system obtains the registration information that is sent by the third-party application server and that includes the IP address of the UE and the external identity information of the UE, and the external identity information is allocated by the third-party application server to the UE. The database control system sends the IP address to the target network element, so that after the target network element obtains the intra-network identity information based on the IP address, the database control system obtains the intra-network identity information from the target network element. The database control system may establish the correspondence between the external identity information and the intra-network identity information. In this way, the database control system may establish the correspondence between the external identity information and the intra-network identity information by obtaining the external identity information from the third-party application server and obtaining the intra-network identity information from the target network element. However, in the prior art, a correspondence between external identity information and intra-network identity information in a communications network is recorded in an HSS through subscription, and consequently the subscription process is complex, and a large amount of data is to be maintained. In the method in the embodiments of this application, the correspondence between the external identity information and the intra-network identity information is dynamically established, so as to reduce correspondence establishment complexity compared with the prior art.

DESCRIPTION OF EMBODIMENTS

The following clearly describes the technical solutions in the embodiments of this application with reference to the accompanying drawings in the embodiments of this application. Apparently, the described embodiments are merely some but not all of the embodiments of this application. All other embodiments obtained by persons skilled in the art based on the embodiments of this application without creative efforts shall fall within the protection scope of this application.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
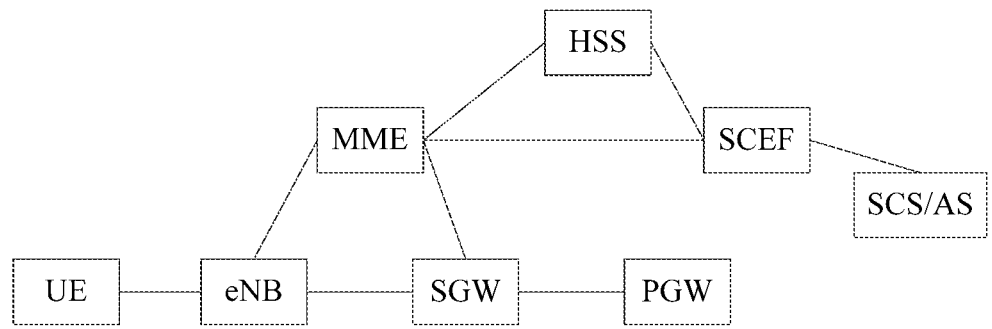
FIG. 1 is a schematic diagram of a communications network architecture according to embodiments of this application.

Referring to a communications network architecture shown in FIG. 1, the communications network architecture includes network elements such as an SCEF (English full name: Service Capability Exposure Function), an HSS (English full name: Home Subscriber Server), a PGW (English full name: PDN Gateway), an MME (English full name: Mobility Management Entity), an eNB (English full name: E-UTRAN NodeB), and a third-party application server SCS/AS. An SCS (English full name: Service Capability Server) and an AS (English full name: Application Server) are third-party application servers in the embodiments of this application. The SCEF may securely provide a third-party application with a key function for service capability exposure in a communications network by using a 3GPP network interface.

In some embodiments of this application, the network architecture shown in FIG. 1 further includes a database control system, and the database control system may establish a correspondence between external identity information and intra-network identity information.

In some embodiments of this application, a NAT (English full name: Network Address Translation) device is deployed in the network architecture shown in FIG. 1.

In some embodiments of this application, the communications network architecture shown in FIG. 1 further includes a MEC (English full name: Mobile Edge Computing). The MEC is provided with a NAT function in some embodiments.

According to a current standard, the third-party application identifies UE (English full name: User Equipment) by using external identity information, and a correspondence between the external identity information and an identity IMSI (English full name: International Mobile Subscriber Identification Number)/MSISDN (English full name: Mobile Subscriber International ISDN/PSTN number) of the UE is subscribed in the HSS. Consequently, a large amount of data is to be maintained for the HSS, and such a subscription process is relatively complex. After the correspondence between the external identity information and the identity IMSI/MSISDN of the UE is subscribed in the HSS, the third-party application server sends, to the SCEF, a monitoring request that includes external identity information of the UE and a monitoring event type. The SCEF obtains identity information (an IMSI\MSISDN) of the UE from the HSS based on the external identity information, obtains, based on the IMSI\MSISDN of the UE, an MME or an SGSN to which the UE is attached, and requests corresponding monitoring information from the MME/SGSN, for example, sends a subscription data insertion request to the MME/SGSN, so that the MME/SGSN (English full name: Serving GPRS Support Node) performs corresponding processing. Then, the MME/SGSN sends a subscription data insertion reply to the HSS, so that the HSS sends a monitoring response to the SCEF. After receiving the monitoring response, the SCEF sends the monitoring response to the third-party application server SCS/AS, to complete the monitoring request initiated by the third-party application server.

In an identity information processing method according to an embodiment of this application, the database control system obtains registration information that is sent by the third-party application server and that includes an IP (English full name: Internet Protocol) address and external identity information, and the external identity information is allocated by the third-party application server to a UE. The database control system sends the IP address to a target network element, so that after the target network element obtains intra-network identity information based on the IP address, the database control system obtains the intra-network identity information from the target network element. In this way, the database control system may establish a correspondence between the external identity information and the intra-network identity information. In this way, the database control system may establish the correspondence between the external identity information and the intra-network identity information by obtaining the external identity information from the third-party application server and obtaining the intra-network identity information from the target network element. However, in the prior art, a correspondence between external identity information and intra-network identity information in a communications network is recorded in an HSS through configuration, and consequently the configuration process is complex, and a large amount of data is to be maintained. In the method in this embodiment of this application, the correspondence between the external identity information and the intra-network identity information is dynamically established, so as to reduce correspondence establishment complexity compared with the prior art.

The identity information processing method in this embodiment of this application includes establishing the correspondence between the external identity information and the intra-network identity information, and includes usage of the correspondence in some embodiments.

It can be understood that the intra-network identity information in this embodiment of this application is information that may be used to uniquely identify the UE in a communications network, and the communications network includes a 3GPP communications network. For example, the intra-network identity information includes but is not limited to an IMSI/MSISDN, a private IP address, and the like, and the IMSI/MSISDN includes either an IMSI or an MSISDN. However, in some embodiments of this application, the intra-network identity information may include both the IMSI and the MSISDN, in other words, the correspondence between the external identity information and the intra-network identity information includes both the IMSI and the MSISDN. This is not limited in this embodiment of this application.

In the identity information processing method in this embodiment of this application, there are a plurality of specific methods for establishing the correspondence between the external identity information and the intra-network identity information. Two methods thereof are illustrated below.

1. The database control system obtains the intra-network identity information from the PGW to establish the correspondence between the external identity information and the intra-network identity information.

Figure 2:
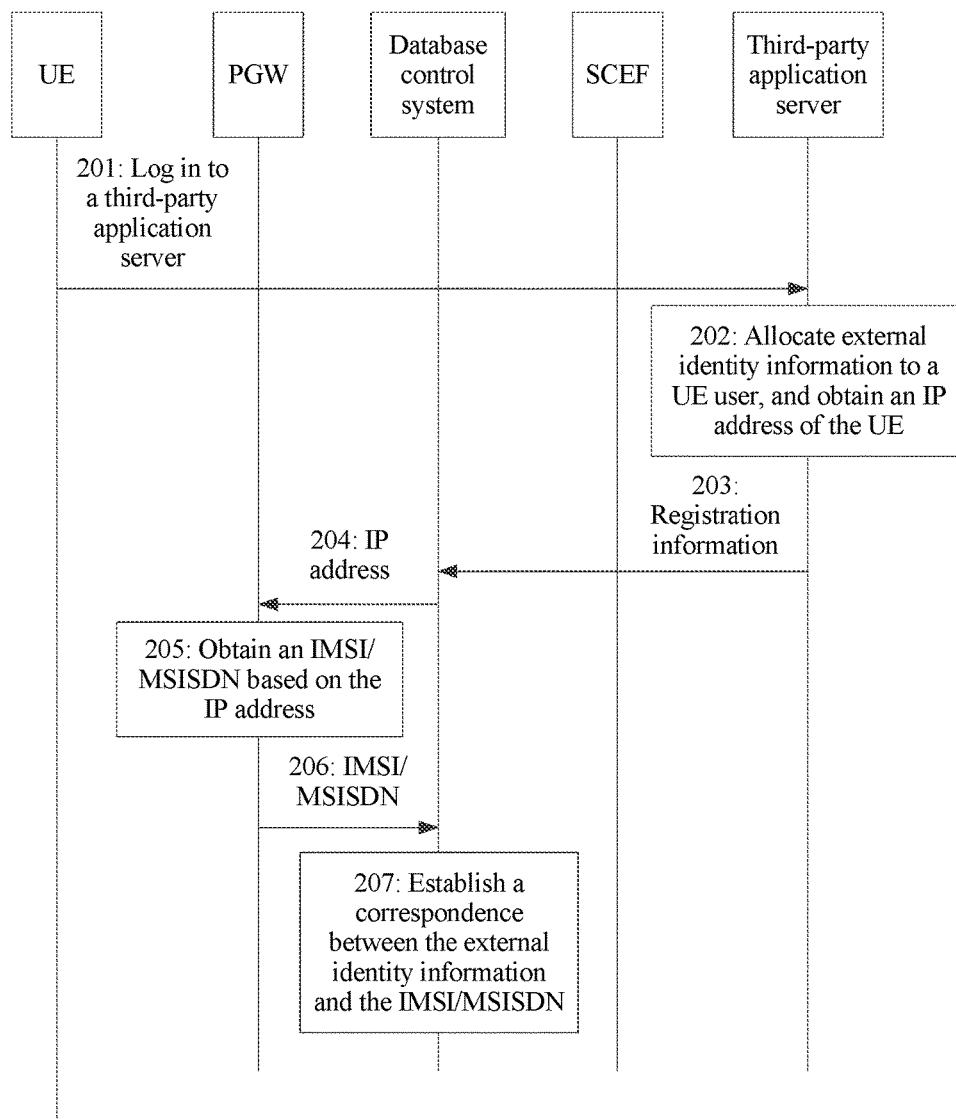
FIG. 2 is a schematic diagram of an identity information processing method according to an embodiment of this application.

It can be understood that an embodiment shown in FIG. 2 is described by using the PGW as an example. In an identity information processing method in this embodiment of this application, the database control system may obtain the intra-network identity information from another gateway device, provided that the gateway device is a device that includes an IP address assigned to the UE and/or stores one or more pieces of intra-network identity information such as an IMSI and an MSISDN. This is not specifically limited in this embodiment of this application.

Referring to the identity information processing method shown in FIG. 2, the method may be applied to the network architecture shown in FIG. 1. A procedure of the method includes the following steps.

Step 201: UE logs in to a third-party application server.

The UE logs in to the third-party application server to connect to the third-party application server. In some embodiments, the UE may log in to the third-party application server for the first time, and a user may register with the third-party application server by using the UE, in other words, the UE registers as a member of a third-party application.

For example, the user logs in to a database control system of a third-party application Microblog A by using a mobile phone, and registers as a new user of Microblog A.

Step 202: The third-party application server allocates external identity information to the UE, and obtains a public IP address of the UE.

After the UE connects to the third-party application server, the third-party application server allocates the external identity information to the UE, and the third-party application server obtains an IP address of the UE. The external identity information is allocated by the third-party application server to the UE, and may be used to identify the UE in the third-party application server. For example, the external identity information may be account identity information used by the third-party application to identify the UE. The third-party application server may obtain the IP address of the UE from a data packet sent by the UE. In some embodiments, the third-party application server has allocated the external identity information to the UE and stored the external identity information. In this case, the third-party application server may obtain the prestored external identity information. After determining the IP address of the UE and the external identity information, the third-party application server may send the IP address and the external identity information to a database control system.

For example, the UE registers with the application Microblog A by using an account name "AA123", the database control system of the application Microblog A allocates external identity information "AA123" to the newly registered UE, and obtains a public IP address: "145.13.0.0" of the UE from the data packet sent by the UE.

It can be understood that in some embodiments of this application, the IP address obtained by the third-party application server may be a private IP address.

Step 203: A database control system obtains registration information sent by the third-party application server.

The registration information includes the IP address of the UE and the external identity information of the UE. The IP address and the external identity information are corresponding to each other, in other words, the IP address and the external identity information belong to same UE. The registration information is information that is sent by the third-party application server to the database control system and that includes the IP address and the external identity information. In some embodiments, the registration information may have other names. This is not specifically limited in this embodiment of this application. To enable the database control system to establish a correspondence, the third-party application server in this embodiment sends the IP address and the external identity information to the database control system by using the registration information.

It can be understood that the IP address in the registration information may be a public IP address or a private IP address. This is not specifically limited in this embodiment of this application.

A public network and a private network are two Internet access manners.

In a private network access manner, an IP address obtained by a computer accessing a network is a reserved address in the Internet, and the reserved address is in the following three forms: 10.x.x.x, 172.16.x.x to 172.31.x.x, and 192.168.x.x. A computer accessing a private network accesses the Internet according to a NAT (network address translation) protocol by using a common gateway. The computer accessing the private network may send a connection request to other computers in the Internet, but other computers in the Internet cannot send a connection request to the computer accessing the private network.

In a public network access manner, an IP address obtained by a computer accessing a network is a non-reserved address in the Internet. A computer accessing a public network and other computers in the Internet may randomly access each other.

NAT (Network Address Translation) implements mutual translation between a private IP address and a public IP address, and translates a large quantity of private IP addresses into one or a few public IP addresses, so as to use fewer public IP addresses. A most typical application of the NAT is as follows: In a local area network, the NAT may be used to share an Internet connection to allow other computers in the local area network to access the Internet, provided that only one computer accesses the Internet. By using the NAT protocol, a computer in the local area network may access a computer in the Internet, but the computer in the Internet cannot access the computer in the local area network. Software such as Internet connection sharing in a Windows operating system, Sygate, WinRoute, and natd in UNIX/Linux uses the NAT protocol to share an Internet connection. Almost all private network Internet access manners provided by ISPs (Internet service providers) are based on the NAT protocol.

Step 204: The database control system sends an IP address to a PGW.

After the database control system obtains the IP address of the UE, the database control system sends the IP address to the PGW. The IP address includes a public IP address and/or a private IP address.

For example, after the database control system obtains the IP address in the registration information, when the database control system determines that there is no intra-network identity information corresponding to the external identity information in the registration information, the database control system sends the IP address to the PGW to obtain the corresponding intra-network identity information.

Step 205: The PGW obtains an IMSI/MSISDN based on the IP address.

When the IP address is the public IP address, the PGW is both an entrance from which an external network sends data to the UE and a device that is responsible for allocating the IP address to the UE. After obtaining the public IP address, the PGW may obtain, based on the public IP address of the UE, a corresponding private IP address from information stored in the PGW, and obtain the IMSI/MSISDN of the UE. After determining that the IMSI/MSISDN is the intra-network identity information, the PGW sends the IMSI/MSISDN to the database control system as the intra-network identity information.

In some embodiments, a NAT device is deployed in a communications network. The database control system sends the public IP address to the PGW, the PGW may obtain the private IP address by using the NAT device based on the public IP address sent by the database control system, and the PGW obtains the IMSI/MSISDN based on the private IP address, and sends the private IP address, the public IP address, and the IMSI/MSISDN to the database control system. The private IP address and the public IP address may be recorded as an identity IP address, and the public IP address is the same as the public IP address obtained from the database control system. After being sent to the database control system, the identity IP address is used to enable the database control system to match indexes based on the IP address and the identity IP address and establish a correspondence between the intra-network identity information and the external identity information. Optionally, the identity IP address may include a public IP address or a private IP address, in other words, the identity IP address may be the private IP address or the public IP address, or include both the private IP address and the public IP address. This is not specifically limited in this embodiment of this application. In this embodiment of this application, the PGW uses the private IP address and the public IP address as the identity IP address, and sends, to the database control system, both the identity IP address and the intra-network identity information IMSI/MSISDN that are corresponding to each other.

For example, after the PGW obtains a public IP address "145.13.0.0" sent by the database control system, the PGW finds, based on the public IP address, a private IP address, of the UE, that is corresponding to the public IP address: "145.13.3.10", and a corresponding IMSI/MSISDN: "460030912121001/13912345678". The PGW determines the IMSI/MSISDN as the intra-network identity information, and determines the public IP address "145.13.0.0" and the private IP address "145.13.3.10" as identity IP addresses. The PGW sends the IMSI/MSISDN, the private IP address "145.13.3.10", and the public IP address "145.13.0.0" to the database control system.

When the IP address is the private IP address, the database control system may send the private IP address to the PGW. After receiving the private IP address sent by the database control system, the PGW obtains the corresponding IMSI/MSISDN based on the private IP address, and sends the IMSI/MSISDN to the database control system. In some embodiments, the PGW further returns the identity IP address to the database control system. In this case, the PGW may determine the private IP address as the identity IP address, or may determine both the public IP address received by the PGW and the private IP address as the identity IP addresses.

It can be understood that the PGW may send the intra-network identity information IMSI/MSISDN to the database control system, or the PGW may send both the IMSI/MSISDN and the identity IP address to the database control system.

Step 206: The database control system receives intra-network identity information sent by the PGW, where the intra-network identity information includes the IMSI/MSISDN.

The PGW sends the IMSI/MSISDN to the database control system, so that the database control system obtains the IMSI/MSISDN. When the PGW further sends other information, the database control system may also obtain the other information. For example, in this embodiment, when obtaining the intra-network identity information IMSI/MSISDN from the PGW, the database control system obtains the identity IP address: a private IP address or a public IP address from the PGW. The intra-network identity information IMSI/MSISDN and the identity IP address are corresponding to each other and belong to same UE.

Step 207: The database control system establishes a correspondence between the external identity information and the IMSI/MSISDN.

Because the IP address and the external identity information that are obtained by the database control system in step 203 belong to same UE, after the database control system sends the IP address to the PGW, the IMSI/MSISDN fed back by the PGW based on the IP address is corresponding to the IP address, in other words, the IMSI/MSISDN also belongs to the UE, so that the database control system can establish the correspondence based on the received IMSI/MSISDN and the external identity information. The IMSI/MSISDN and the external identity information in the correspondence belong to the same UE. As shown in Table 1, Table 1 shows the correspondence that is between the external identity information and the IMSI/MSISDN and that is established by the database control system. The database may establish one or more correspondences. This is not specifically limited in this embodiment of this application.

In some embodiments, the database control system has obtained the external identity information and the IP address of the UE in step 203, and after the database control system obtains the intra-network identity information IMSI/MSISDN, the database control system establishes the correspondence between the external identity information and the IMSI/MSISDN based on the IP address and the identity IP address. For example, when the IP address obtained by the database control system in step 203 is a public IP address, and the identity IP address is the public IP address, the database control system establishes the correspondence between the external identity information and the IMSI/MSISDN in a manner shown in Table 2. Table 2 shows examples of two correspondences. Examples of one or more correspondences may be further included in this embodiment of this application. This is not specifically limited in this embodiment of this application. After establishing the correspondence, the database control system may store the correspondence to prepare for subsequent usage of the correspondence. For example, when the third-party application server initiates the monitoring request, the database control system provides a service for the monitoring request. When obtaining the external identity information sent by the third-party application server, the database control system may determine the corresponding intra-network identity information based on the correspondence, to provide the intra-network identity information for a corresponding network device.

When NAT is deployed, the IP address of the UE that is obtained by the third-party application server is a public IP address obtained after the NAT. The IP address of the UE in a 3GPP communications network is a private network address. The database control system sends the public IP address to the PGW. The PGW obtains, based on the public IP address, a private IP address corresponding to the public IP address and the IMSI/MSISDN, and then sends the IMSI/MSISDN and the private IP address to the database control system. In this way, the database control system establishes the correspondence between the external identity information and the intra-network identity information IMSI/MSISDN in a manner shown in Table 3.

It can be understood that when the IP address obtained by the database control system in step 203 is the private IP address, the database control system sends the private IP address to the PGW. After the PGW obtains the corresponding IMSI/MSISDN based on the private IP address, in addition to the IMSI/MSISDN, the PGW may further return the identity IP address to the database control system when the private IP address is the identity IP address. In this case, the database control system may establish the correspondence between the external identity information and the intra-network identity information IMSI/MSISDN by using the identity IP address.

TABLE 1

| IMSI/MSISDN | External identity information |
| --- | --- |
| 460030912121001/13912345678 | AA123 |
| 460010123421123/13888888888 | 12345 |

TABLE 2

| IMSI/MSISDN | External identity information | Public IP address |
| --- | --- | --- |
| 460030912121001/13912345678 | AA123 | 145.13.0.0 |
| 460010123421123/13888888888 | 12345 | 141.14.64.0 |

TABLE 3

| IMSI/MSISDN | Public address IP | Private IP address | External identity information |
|---|---|---|---|
| 460030912121001/13912345678 | 145.13.0.0 | 145.13.3.10 | AA123 |
| 460010123421123/13888888888 | 141.14.64.0 | 141.14.72.24 | 12345 |

After establishing the correspondence between the external identity information and the IMSI/MSISDN, the database control system may store the correspondence. In some embodiments, the database control system may further establish and store a correspondence between the external identity information, the IMSI/MSISDN, the public IP address, and/or the private IP address.

In this way, after the database control system establishes the correspondence between the external identity information and the intra-network identity information, the database control system receives the external identity information sent by the preset network element, and the database control system determines, based on the correspondence between the external identity information and the intra-network identity information, the IMSI/MSISDN corresponding to the external identity information sent by the preset network element, so that the database control system can send the determined IMSI/MSISDN to the preset network element. The preset network element includes an HSS or an SCEF. This is described in detail in the following manner 1 and manner 2.

It can be understood that in some embodiments, the database control system establishes the correspondence between the external identity information and the IMSI/MSISDN by using the public IP address and the identity IP address. To be specific, when the PGW returns the public IP address and the IMSI/MSISDN, in other words, the identity IP address is the public IP address, the database control system establishes the correspondence between the external identity information and the IMSI/MSISDN based on the public IP address. When the PGW returns the private IP address and the IMSI/MSISDN, in other words, the identity IP address is the private IP address, the database control system establishes the correspondence between the external identity information and the IMSI/MSISDN based on the public IP address and the private IP address. When the PGW returns the public IP address, the private IP address, and the IMSI/MSISDN, in other words, the identity IP address is the private IP address and the public IP address, the database control system establishes the correspondence between the external identity information and the IMSI/MSISDN based on the public IP address and the private IP address. In the identity information processing method in this embodiment of this application, the correspondence between the external identity information and the intra-network identity information may be further established in another manner. This is not specifically limited in this embodiment of this application.

In some embodiments of this application, the database control system may directly establish the correspondence between the external identity information and the IMSI/MSISDN. For example, when the PGW returns the IMSI/MSISDN to the database control system, the database control system directly establishes the correspondence between the external identity information and the IMSI/MSISDN based on a correspondence between transmitted messages. For example, after the database control system directly sends the IP address in the received registration information to the PGW, and the PGW returns the corresponding IMSI/MSISDN, the database control system establishes the correspondence between the external identity information in the registration information and the IMSI/MSISDN.

Alternatively, in some embodiments, the database control system may identify the external identity information by using a preset identity, and send the preset identity and the IP address to the PGW. After the PGW obtains the intra-network identity information based on the IP address, the PGW sends the intra-network identity information and the preset identity to the database control system, so that the database control system can establish the correspondence between the external identity information and the intra-network identity information by pairing the target identity. In this case, the PGW does not send the identity IP address to the database control system. In conclusion, a specific method for establishing the correspondence between the external identity information and the intra-network identity information is not specifically limited in this embodiment of this application.

It can be understood that in this embodiment, the intra-network identity information is the IMSI/MSISDN. However, there may be a plurality of manners of setting the intra-network identity information in this embodiment of this application. This is not specifically limited in this embodiment of this application. For example, in some embodiments of this application, the intra-network identity information may be the private IP address. In this case, the PGW may not need to obtain and send the IMSI/MSISDN to the database control system. In this case, the correspondence that is between the external identity information and the intra-network identity information and that is established by the database control system is a correspondence between the external identity information and the private IP address. In this case, after obtaining the private IP address, the database control system may establish the correspondence between the external identity information and the private IP address. In some embodiments, the intra-network identity information may further include the private IP address in addition to the IMSI/MSISDN. In some embodiments, the intra-network identity information may include both the IMSI and the MSISDN.

In conclusion, the database control system may establish the correspondence between the external identity information and the intra-network identity information by obtaining the external identity information from the third-party application server and obtaining the intra-network identity information from the target network element. However, in the prior art, a correspondence between external identity information and intra-network identity information in a 3GPP communications network is recorded through subscription, and consequently the subscription process is complex, and a large amount of data is to be maintained. In the method in this embodiment of this application, the correspondence between the external identity information and the intra-network identity information is dynamically established, so as to reduce correspondence establishment complexity compared with the prior art.

After the database control system establishes the correspondence between the external identity information and the intra-network identity information, the communications system may perform a corresponding operation by using the correspondence, for example, provide a service for the monitoring request initiated by the third-party application. The following lists two examples in which the intra-network identity information in the correspondence established by the database control system is the IMSI/MSISDN and the third-party application server initiates the monitoring request, to describe usage of the correspondence between the external identity information and the intra-network identity information in the database control system.

Figure 3:
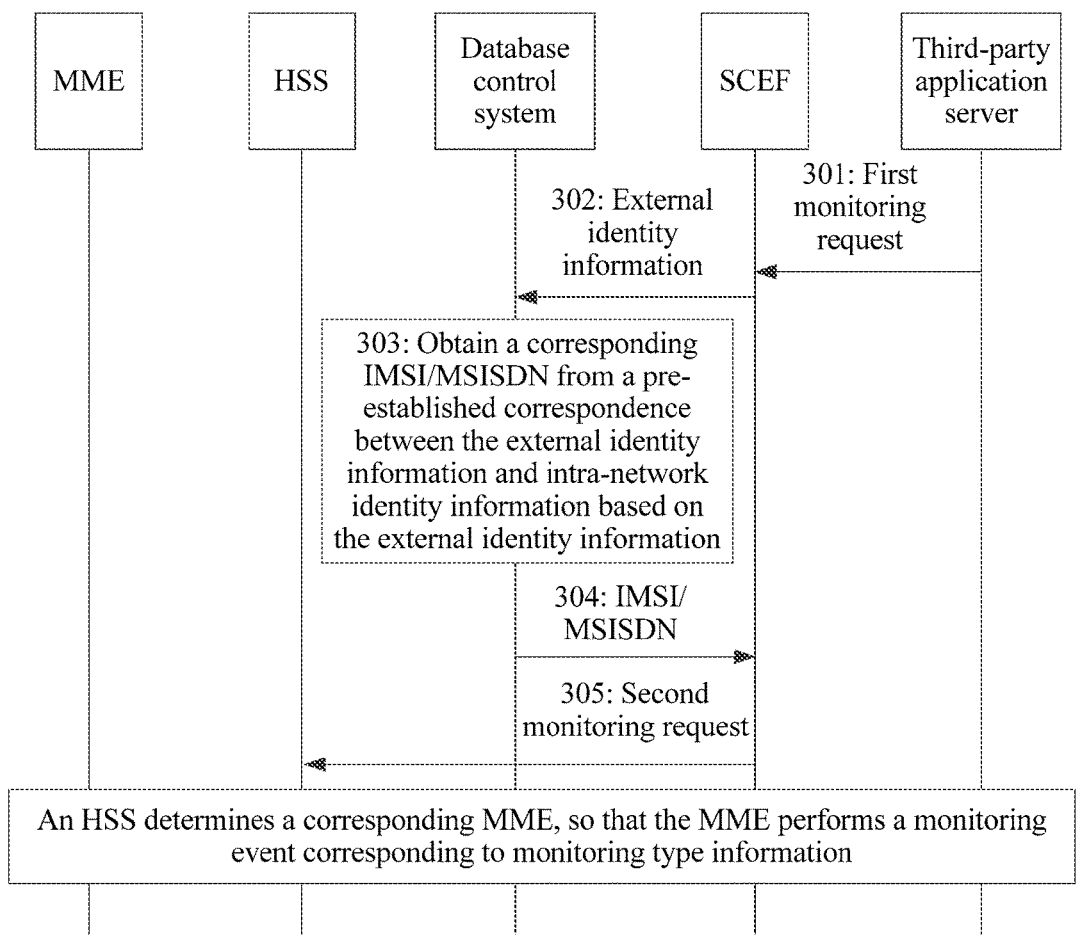
FIG. 3 is a schematic diagram of an identity information processing method according to another embodiment of this application.

Manner 1:

Referring to FIG. 3, a procedure of an identity information processing method according to an embodiment of this application includes the following steps.

Step 301: An SCEF obtains a first monitoring request from a third-party application server.

The first monitoring request includes external identity information and monitoring type information.

When the third-party application server needs to monitor a UE in the third-party application server, the third-party application server determines external identity information of the UE and determines to-be-monitored monitoring type information. The third-party application server sends the first monitoring request to the SCEF, and the first monitoring request includes the external identity information and the monitoring type information, so that the SCEF obtains the first monitoring request.

For example, when an application Microblog A needs to know geographical location information of a user "AA123" to perform a location-based service, a database control system of the application Microblog A determines external identity information "AA123" of the UE and a monitoring type "geographical location information obtaining", and sends, to the SCEF, a monitoring request that includes information about "AA123" and "geographical location information obtaining", so that after obtaining the monitoring request, the SCEF can obtain the external identity information "AA123" and the monitoring type "geographical location information obtaining".

Step 302: The SCEF sends external identity information to a database control system.

That the SCEF sends the obtained external identity information to the database control system may be that the SCEF sends the external identity information to the database control system by sending the monitoring request that carries the external identity information to the database control system.

Step 303: The database control system obtains a corresponding IMSI/MSISDN from a pre-established correspondence between the external identity information and intra-network identity information based on the external identity information sent by the SCEF.

The database control system stores the pre-established correspondence between the external identity information and the intra-network identity information IMSI/MSISDN, for example, establishes the correspondence according to the embodiment shown in FIG. 2. After the database control system obtains the external identity information sent by the SCEF, the database control system queries a corresponding IMSI/MSISDN in the pre-established correspondence between the external identity information and the intra-network identity information based on the external identity information. After obtaining the IMSI/MSISDN, the database control system sends the IMSI/MSISDN to the SCEF.

For example, after the database control system obtains the external identity information "AA123" sent by the SCEF, the database control system may find, based on the pre-established correspondence in Table 1 or Table 2, the IMSI/MSISDN "460030912121001/13912345678" corresponding to "AA123", and then the database control system sends the IMSI/MSISDN to the SCEF.

Step 304: The SCEF obtains the IMSI/MSISDN from the database control system.

Step 305: The SCEF sends a second monitoring request to an HSS.

The second monitoring request includes the intra-network identity information IMSI/MSISDN and the monitoring type information. To perform the monitoring request of the third-party application server, after the SCEF determines the HSS in which the UE corresponding to the monitoring request is located, the SCEF may send the obtained IMSI/MSISDN and the monitoring type information to the HSS, in other words, the SCEF sends the second monitoring request to the HSS. After obtaining the second monitoring request, the HSS determines a corresponding MME based on the IMSI/MSISDN in the second monitoring request, and requests, from the MME, monitoring event information corresponding to the monitoring type information, to complete the monitoring request of the third-party application server. A specific method for processing a monitoring event by the MME is not specifically limited in this embodiment of this application.

For example, after obtaining the IMSI/MSISDN "460030912121001/13912345678", the SCEF obtains the second monitoring request based on the IMSI/MSISDN and the previously obtained monitoring type information "geographical location information obtaining", and sends the monitoring request to the HSS. After the HSS obtains the second monitoring request, the HSS may determine, based on the IMSI/MSISDN, the MME in which the UE is located, to initiate, to the MME based on the monitoring type information "geographical location information obtaining", a request for obtaining location information of a target UE corresponding to the IMSI/MSISDN. After the MME obtains the request from the HSS, the MME performs processing to obtain the geographical location information of the target UE. For example, the geographical location information is "Luohu district, Shenzhen", or the geographical location information is a location area identity such as a cell ID of the target UE. Then, the MME returns the geographical location information to the HSS, the HSS returns the geographical location information to the SCEF, and the SCEF returns the geographical location information to the database control system of the application Microblog A.

In the identity information processing method in this embodiment of this application, when the third-party application server initiates the monitoring request to the SCEF, the SCEF may obtain the intra-network identity information IMSI/MSISDN from the database control system that pre-establishes the correspondence between the external identity information and the intra-network identity information, and send the IMSI/MSISDN and the monitoring type information to the HSS, so that the HSS can determine the corresponding MME based on the IMSI/MSISDN, and request, from the MME, the monitoring event corresponding to the monitoring type information. The SCEF may obtain the IMSI/MSISDN from the database control system. However, in the prior art, the SCEF obtains the IMSI/MSISDN from subscription data of the HSS.

It can be understood that in the embodiment of Manner 1, the monitoring request is performed by using the intra-network identity information IMSI/MSISDN. This embodiment of this application is not limited to a case in which the intra-network identity information is the IMSI/MSISDN, and the intra-network identity information may be further other intra-network identity information such as a private IP address. For example, when a correspondence between external identity information and a private IP address is pre-established in the database control system, the SCEF may obtain the corresponding private IP address from the database control system based on the external identity information sent by the third-party application server, to perform the monitoring request of the third-party application server based on the private IP address.

In Manner 1, when the third-party application server initiates the monitoring request, after the SCEF obtains the intra-network identity information from the database control system, the SCEF sends the intra-network identity information to the HSS, to perform a subsequent monitoring operation. There are other processes of performing the monitoring request initiated by the third-party application server, and the database control system may provide the intra-network identity information to different network elements. The following manner 2 describes an example in which the HSS directly obtains the intra-network identity information from the database control system.

Figure 4:
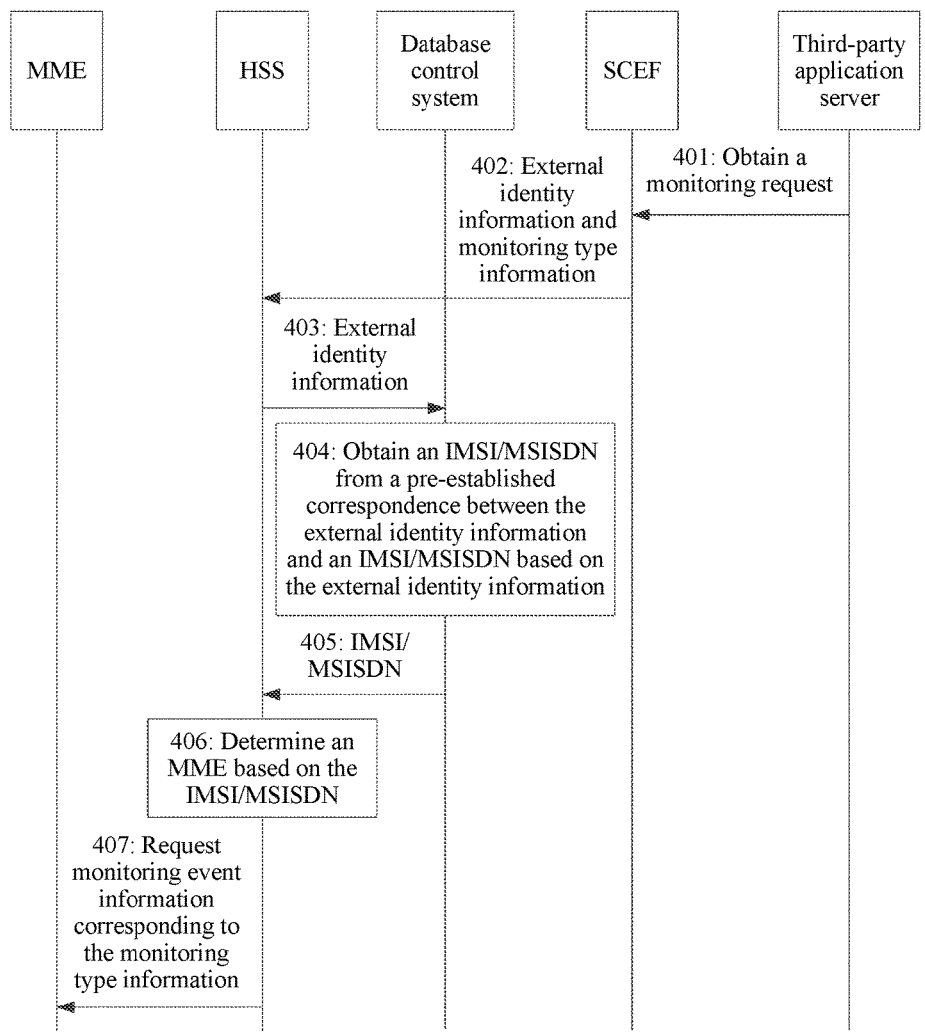
FIG. 4 is a schematic diagram of an identity information processing method according to another embodiment of this application.

Manner 2:

Referring to FIG. 4, a procedure of an identity information processing method according to an embodiment of this application includes the following steps.

Step 401: An SCEF obtains a monitoring request from a third-party application server.

The monitoring request includes an IP address, external identity information, and monitoring type information.

When the third-party application server needs to monitor a UE in the third-party application server, the third-party application server sends, to the SCEF, the monitoring request that includes the IP address, the external identity information, and the monitoring type information. The IP address may be obtained by a third-party application from a data packet sent by the UE that needs to be monitored, and the external identity information may be obtained by reading information stored in the third-party application server.

For example, a third-party application Microblog A needs to obtain geographical location information of a target UE, and after determining that external identity information of the target UE is "AA123" and determining that monitoring type information "geographical location information obtaining", a database control system of the application Microblog A sends the monitoring request that carries "AA123" and "geographical location information obtaining" to the SCEF. In some cases, the monitoring type information may be replaced with identity information, and a network element that obtains a monitoring type identity may determine a monitoring step in a corresponding mapping table based on the identity.

Step 402. An HSS obtains external identity information and monitoring type information from the SCEF.

After the SCEF obtains the monitoring request sent by the third-party application server, the SCEF may determine, based on the IP address in the monitoring request, the HSS in which the UE is located, and then send the external identity information and the monitoring type information in the monitoring request to the HSS. For example, the SCEF sends, to the HSS, another monitoring request that includes the external identity information and the monitoring type information, so that the HSS obtains the external identity information and the monitoring type information.

Step 403: The HSS sends the external identity information to a database control system.

To obtain an IMSI or an MSISDN to determine that an MME performs the monitoring request of the third-party application server, the HSS sends the external identity information to that database control system that stores a pre-established correspondence between the external identity information and the IMSI/MSISDN.

Step 404: The database control system obtains an IMSI/MSISDN from a pre-established correspondence between the external identity information and the IMSI/MSISDN based on the external identity information sent by the HSS.

After the database control system obtains the external identity information sent by the HSS, because the database control system stores the pre-established correspondence between the external identity information and the IMSI/MSISDN, the database control system may obtain, based on the correspondence, the IMSI/MSISDN corresponding to the external identity information sent by the HSS. After obtaining the IMSI/MSISDN, the database control system may send the IMSI/MSISDN to the HSS.

For example, after obtaining the external identity information "AA123" and the monitoring type information "geographical location information obtaining", the HSS sends "AA123" to the database control system, and the database control system finds the corresponding IMSI/MSISDN "460030912121001/13912345678" from the pre-established correspondence in Table 1 or Table 2 based on "AA123", so that the database control system can send the IMSI/MSISDN to the HSS.

Step 405: The HSS obtains the IMSI/MSISDN from the database control system.

Step 406: The HSS determines an MME based on the IMSI/MSISDN.

Because the IMSI/MSISDN is corresponding to the UE, and the UE is corresponding to the monitoring request of the third-party application server, the MME determined by the HSS based on the IMSI/MSISDN is an MME to which the UE is attached.

Step 407: The HSS requests, from the MME, monitoring event information corresponding to the monitoring type information.

After the HSS determines the MME, the HSS may send the monitoring request to the MME, to request, from the MME, the monitoring event information corresponding to the monitoring type information. A processing method in which the MME performs a monitoring event is not specifically limited in this embodiment of this application, provided that the monitoring request initiated by the third-party application server can be completed.

For example, after determining, based on the IMSI/MSISDN, the MME in which the UE is located, the HSS initiates, to the MME based on the monitoring type information "geographical location information obtaining", a request for obtaining location information of the target UE corresponding to the IMSI/MSISDN. After the MME obtains the request from the HSS, the MME performs processing to obtain the geographical location information of the target UE. For example, the geographical location information is "Luohu district, Shenzhen", or the geographical location information is a location area such as a cell ID of the target UE. Then, the MME returns the geographical location information to the HSS, the HSS returns the geographical location information to the SCEF, and the SCEF returns the geographical location information to the database control system of the application Microblog A.

In the identity information processing method in this embodiment of this application, after obtaining the external identity information and the monitoring type information, the HSS may send the external identity information to the database control system that pre-establishes the correspondence between the external identity information and the intra-network identity information, so that the database control system returns the corresponding intra-network identity information IMSI/MSISDN. The HSS determines the MME based on the IMSI/MSISDN, and initiates, to the MME, the monitoring request corresponding to the monitoring type information. The HSS may obtain the IMSI/MSISDN from the database control system. However, in the prior art, the HSS obtains the IMSI/MSISDN from subscription data of the HSS. In other words, the method in this embodiment of this application is a method different from a prior-art approach of obtaining the intra-network identity information, and the correspondence between the intra-network identity information IMSI/MSISDN and the external identity information is stored in the database control system instead of the HSS, so as to reduce data maintenance of the HSS and the like.

It can be understood that in the embodiment of Manner 2, the monitoring request is performed by using the intra-network identity information IMSI/MSISDN. This embodiment of this application is not limited to a case in which the intra-network identity information is the IMSI/MSISDN, and the intra-network identity information may be further other intra-network identity information such as a private IP address or a public IP address. For example, when a correspondence between external identity information and a private IP address is pre-established in the database control system, the SCEF may obtain the corresponding private IP address from the database control system based on the external identity information sent by the third-party database control system, to perform, based on the private IP address, the monitoring request corresponding to the third-party database control system.

2. The database control system obtains the intra-network identity information from the Mobile Edge Computing (MEC for short) platform to establish the correspondence between the external identity information and the intra-network identity information.

The MEC is a Mobile Edge Computing function, may not be a specific device and may be a portfolio of a function device. By using this function, a data stream may connect to a local application server by using the function device.

Figure 5:
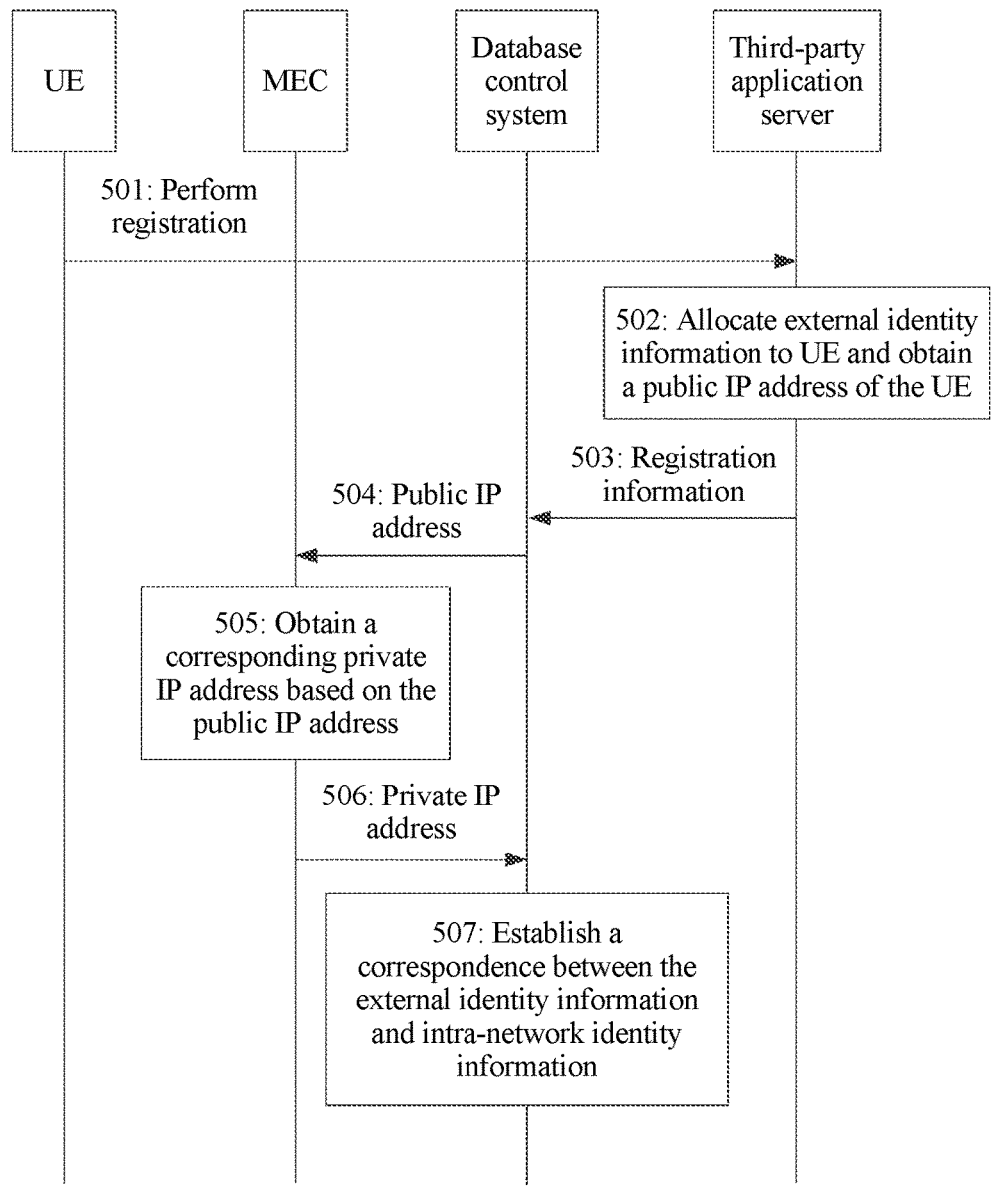
FIG. 5 is a schematic diagram of an identity information processing method according to an embodiment of this application.
Figure 6:
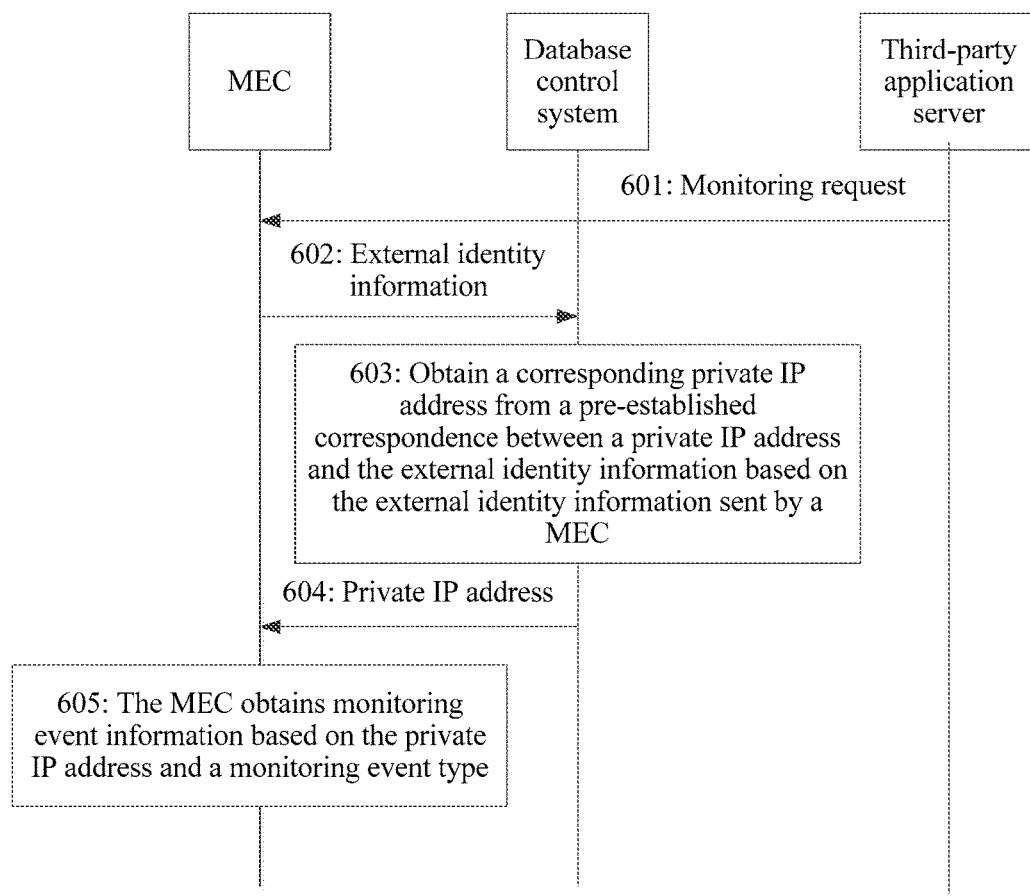
FIG. 6 is a schematic diagram of an identity information processing method according to another embodiment of this application.

In a MEC scenario, the database control system may obtain the intra-network identity information from the MEC. When the MEC is locally provided with a NAT function, if the MEC cannot obtain the MSISDN/IMSI of the UE in the 3GPP network, the intra-network identity information may be a private IP address. After the database control system obtains the private IP address from the MEC, the database control system may establish a correspondence between the external identity information and the private IP address. An identity information processing method that is to be described below is a case in which a network architecture includes a MEC. Referring to FIG. 5, a procedure of the identity information processing method includes the following steps.

Step 501: UE logs in to a third-party application server. In this process, the UE registers with a third-party application device.

For example, a user logs in to a database control system of a third-party application Microblog A by using the UE, and registers with Microblog A by using a new account. The account name is "AA123."

Step 502. The third-party application server allocates external identity information to the UE, and obtains a public IP address of the UE.

The UE registers with the third-party application device, and the third-party application server allocates the external identity information to the UE, and obtains the public IP address of the UE from a data packet sent by the UE. The external identity information may be identity information used by a third-party application servicer to identify the UE.

For example, after the UE registers with Microblog A by using the account name "AA123", the database control system of Microblog A allocates "AA123" to the UE to serve as the external identity information, and the database control system of Microblog A obtains the public IP address "145.13.0.0" from the data packet sent by the UE.

It can be understood that in other embodiments of this application, if the UE does not register with but logs in to the third-party application server, after the third-party application server determines that the third-party application server stores the external identity information previously allocated to the UE, the third-party application server may directly read the external identity information.

After the third-party application server allocates the external identity information to the UE and obtains the public IP address of the UE, the third-party application server may send registration information that includes the external identity information and the public IP address to the database control system. The registration information may be replaced with other names. This is not specifically limited in this embodiment of this application, provided that the external identity information and the public IP address are included and sent by the third-party application server to the database control system.

Step 503: A database control system obtains registration information sent by the third-party application server.

The registration information includes the public IP address and the external identity information that are corresponding to each other, in other words, the public IP address and the external identity information belong to a same UE.

The database control system may obtain, in another manner, the registration information sent by the third-party application server. For example, the database control system may obtain the registration information sent by the third-party application server, by using a MEC, specifically, a capability exposure function of the MEC.

Step 504: The database control system sends the public IP address to a MEC.

The database control system sends, to the MEC, the public IP address obtained from the third-party application server.

Step 505: The MEC obtains a corresponding private IP address based on the public IP address.

After the MEC obtains the public IP address sent by the database control system, because the MEC is locally provided with the NAT function, and the MEC records the private IP address of the UE, the MEC may obtain the corresponding private IP address based on the public IP address, and send the private IP address to the database control system.

For example, after the database control system sends the public IP address of the UE to the MEC, the MEC obtains, based on the public IP address "145.13.0.0", the private IP address "145.13.3.10" corresponding to the UE.

Step 506: The database control system receives the private IP address sent by the MEC.

Step 507: The database control system establishes a correspondence between the external identity information and intra-network identity information.

The public IP address sent by the third-party application server is corresponding to the external identity information, and the private IP address sent by the MEC to the database control system is corresponding to the public IP address. Therefore, the database control system establishes a correspondence between the external identity information and the private IP address by matching the public IP address and the private IP address. As shown in Table 3, after being established, the correspondence may be stored, to provide a corresponding service for a network device.

In some embodiments, the database control system may establish a correspondence between the external identity information, the public IP address, and the intra-network identity information.

TABLE 4

| Private IP address | External identity information |
|---|---|
| 145.13.3.10 | AA123 |
| 141.14.72.24 | 12345 |

It can be understood that in some embodiments, in step 506, the MEC may send both the private IP address and the public IP address, so that the database control system can establish the correspondence between the private IP address and the external identity information by using the public IP address. In some embodiments, the database control system may establish the correspondence between the private IP address and the external identity information based on a correspondence between messages, to be specific, after sending the public IP address corresponding to the external identity information to the MEC, the database control system receives the private IP address returned by the MEC, and the database control system may directly establish the correspondence between the private IP address and the external identity information. In some embodiments, the database control system may identify the external identity information by using a preset identity, and send the preset identity to the MEC, so that the MEC can determine the private IP address by using the preset identity, and the database control system can establish the correspondence between the external identity information and the private IP address by using the preset identity.

After the database control system establishes the correspondence between the external identity information and the intra-network identity information, the database control system may receive external identity information sent by a preset network element, and then the database control system determines, based on the correspondence between the external identity information and the intra-network identity information, intra-network identity information corresponding to the external identity information sent by the preset network element. After determining the intra-network identity information, the database control system sends the determined intra-network identity information to the preset network element. In this way, the correspondence is applied. The preset network element may be the MEC.

Step 508: The UE exits the third-party application server.

Step 509: The third-party application server generates a deletion request.

A different private IP address may be assigned to the UE each time the UE accesses a network. To update in time the correspondence between the external identity information and the private IP address in the database control system, the third-party application server may generate the deletion request after the third-party application server detects that the UE exits the third-party application server, to instruct the database control system to delete the correspondence between the external identity information and the private IP address of the UE.

Step 510: The database control system obtains the deletion request from the third-party application server.

Specifically, the database control system may obtain the deletion request from the third-party application server in another manner. For example, the database control system may obtain the deletion request from the third-party application server by using the MEC (for example, the capability exposure function of the MEC).

Step 511: The database control system deletes a correspondence between the external identity information and the private IP address according to the deletion request.

The deletion request is corresponding to the UE of the third-party application server. After the database control system obtains the deletion request, the database control system determines the correspondence between the external identity information and the intra-network identity information of the corresponding UE according to the deletion request, and deletes the correspondence. In this case, because a private IP address assigned to the UE frequently changes, the database control system may delete an unnecessary correspondence according to the deletion request, so as to use less storage space, and prepare for establishing a next correspondence between the external identity information and the private IP address of the UE.

It can be understood that step 509 to step 511 are probable solutions, and step 509 to step 511 may not be included in some embodiments of this application. For example, the database control system may delete the correspondence between the external identity information and the private IP address in a preset time period. Alternatively, the database control system does not delete the correspondence.

It can be understood that the database control system may determine the correspondence between the external identity information and the intra-network identity information of the corresponding UE according to the deletion request, and delete the correspondence. In the foregoing embodiment, the deletion request is generated when the third-party application detects the exit of the UE. In some embodiments, the deletion request may be generated by a third-party database control system in a preset time period. Alternatively, when detecting that the public IP address of the UE is different from a public IP address used during previous login, a third-party database control system generates the deletion request and sends the deletion request to the database control system. In other words, a specific scenario of generating the deletion request is not limited in this embodiment of this application.

It can be understood that in the foregoing embodiment, a scenario in which the MEC is provided with a NAT device and the intra-network identity information is the private IP address is described. In other embodiments of this application, the MEC may be provided with no NAT device, and the intra-network identity information may not be limited to the private IP address. This is not specifically limited in this embodiment of this application.

In conclusion, in the technical solution provided in this embodiment of this application, the database control system obtains the registration information that is sent by the third-party application server and that includes the IP address and the external identity information that are corresponding to each other, and the external identity information is allocated by the third-party application to a UE. The database control system sends the IP address to the MEC, so that after the MEC obtains the private IP address based on the IP address, the database control system obtains the private IP address from the MEC. The database control system may establish the correspondence between the external identity information and the private IP address. In this way, the database control system may establish the correspondence between the external identity information and the intra-network identity information by obtaining the external identity information from the third-party application server and obtaining the private IP address from the MEC. When the third-party application server initiates the monitoring request, the database control system that pre-establishes the correspondence between the external identity information and the private IP address may provide the private IP address for the corresponding network element, so as to improve processing efficiency of the monitoring request initiated by the third-party application server in the network, and reduce load of other network elements. For example, some network elements may obtain the private IP address of the UE from the MEC, and perform, based on the private IP address, the monitoring request used by the third-party application for the UE. The correspondence between the private IP address and the external identity information is dynamically established, so as to simplify the correspondence establishment process.

An example in which the intra-network identity information in the correspondence is the private IP address and the third-party application server initiates the monitoring request is used below to describe how the database control system uses the correspondence in the database control system after establishing the correspondence between the external identity information and the private IP address.

Step 601: A MEC receives a monitoring request sent by a third-party application server.

The monitoring request includes external identity information of UE and a monitoring event type. The monitoring event type is not specifically limited in this embodiment of this application.

For example, when the third-party application server needs to obtain current address information of UE, the third-party application server sends the monitoring request to the MEC, and the monitoring request includes the external identity information of the UE and an address obtaining request.

Step 602: The MEC sends external identity information of UE to a database control system.

After obtaining the monitoring request sent by the third-party application server, the MEC sends, to the database control system, the external identity information carried in the monitoring request, so that the database control system returns a private IP address corresponding to the external identity information.

Step 603: The database control system obtains a corresponding private IP address from a pre-established correspondence between a private IP address and the external identity information based on the external identity information sent by the MEC.

The database control system stores the pre-established correspondence between the private IP address and the external identity information. After obtaining the external identity information sent by the MEC, the database control system performs a query in the correspondence based on the obtained external identity information, to obtain the private IP address corresponding to the external identity information sent by the MEC.

Step 604: The MEC receives the private IP address sent by the database control system.

After obtaining the private IP address corresponding to the external identity information sent by the MEC, the database control system sends the private IP address to the MEC.

Step 605: The MEC obtains monitoring event information based on the private IP address and a monitoring event type.

After the MEC receives the private IP address sent by the database control system, the MEC may obtain the corresponding monitoring event information based on the private IP address and the monitoring event request obtained in step 601. A specific method for obtaining the monitoring event information is not specifically limited in this embodiment of this application. For example, the MEC may obtain the corresponding monitoring event information from a related device, for example, instruct an access network to obtain information of a terminal device in the access network.

In conclusion, in the technical solution provided in this embodiment of this application, the database control system receives the IP address sent by the third-party application server, and the database control system obtains the private IP address from the MEC, so that the database control system can establish the correspondence between the external identity information and the private IP address. In this way, during subsequent work, the MEC may send the obtained external identity information of the UE to the database control system, so that the database control system obtains the corresponding private IP address from the pre-established correspondence between the private IP address and the external identity information based on the external identity information, and feeds back the private IP address to the MEC. In this way, the MEC performs a corresponding subsequent operation based on the private IP address sent by the database control system, for example, performs the monitoring request. In this way, the MEC may obtain the private IP address of the same UE from the database control system based on the external identity information of the UE, so as to conveniently and quickly obtain the private IP address of the UE.

Figure 7:
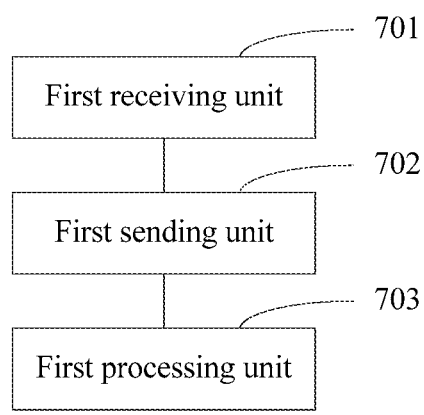
FIG. 7 is a schematic structural diagram of a database control system according to an embodiment of this application.

Specifically, FIG. 7 shows a database control system according to an embodiment of this application. FIG. 7 is a schematic structural diagram of a database control system. The database control system shown in FIG. 7 may be configured to implement functions of the database control system in the foregoing embodiments, and the database control system specifically includes a first receiving unit 701, a first sending unit 702, and a first processing unit 703.

The first receiving unit 701 is configured to receive registration information sent by a third-party application server. The registration information includes an IP address of UE and external identity information of the UE, and the external identity information is allocated by the third-party application server to the UE.

The first sending unit 702 is configured to send the IP address to a target network element.

The first receiving unit 701 is further configured to receive intra-network identity information of the UE that is returned by the target network element based on the IP address.

The first processing unit 703 is configured to establish a correspondence between the external identity information and the intra-network identity information.

Optionally, the target network element includes a PGW, and the intra-network identity information includes an IMSI/MSISDN.

Figure 8:
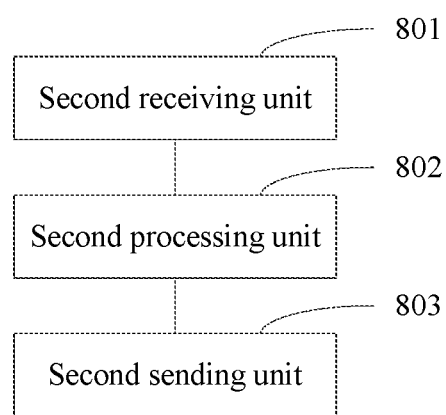
FIG. 8 is a schematic structural diagram of a PGW according to an embodiment of this application.

Optionally, the database control system is connected to the PGW. FIG. 8 is a schematic structural diagram of the PGW.

When the IP address is a public IP address, the PGW includes:

a second receiving unit 801, configured to receive the public IP address sent by the database control system;

a second processing unit 802, configured to obtain a private IP address based on the public IP address, where the second processing unit 802 is configured to obtain an IMSI/MSISDN based on the private IP address; and a second sending unit 803, configured to send the IMSI/MSISDN to the database control system.

Alternatively, when the IP address is a private IP address, the PGW includes: a second receiving unit 801, configured to receive the private IP address sent by the database control system; a second processing unit 802, configured to obtain an IMSI/MSISDN based on the private IP address; and a second sending unit 803, configured to send the IMSI/MSISDN to the database control system.

Optionally, the first receiving unit 701 is further configured to receive external identity information sent by a preset network element;

the first processing unit 703 is further configured to determine, based on the correspondence between the external identity information and the intra-network identity information, an IMSI/MSISDN corresponding to the external identity information sent by the preset network element; and the first sending unit 702 is further configured to send the determined IMSI/MSISDN to the preset network element.

Optionally, the preset network element includes an HSS or an SCEF.

Optionally, the target network element includes a MEC, the IP address is a public IP address, and the intra-network identity information includes a private IP address.

Optionally, the first receiving unit 701 is configured to receive a deletion request sent by the third-party application server, where the deletion request is sent by the third-party application server when a terminal corresponding to the private IP address exits the third-party application server; and the first processing unit 703 is further configured to delete the correspondence between the external identity information and the intra-network identity information according to the deletion request.

In the technical solution provided in this embodiment of this application, the first receiving unit 701 receives the registration information that is sent by the third-party application server and that includes the IP address and the external identity information that are corresponding to each other, and the external identity information is allocated by the third-party application server to the end user. The first sending unit 702 sends the IP address to the target network element, so that after the target network element obtains the intra-network identity information based on the IP address, the first receiving unit 701 obtains the intra-network identity information from the target network element. The first processing unit 703 may establish the correspondence between the external identity information and the intra-network identity information. In this way, the database control system may establish the correspondence between the external identity information and the intra-network identity information by obtaining the external identity information from the third-party application server and obtaining the intra-network identity information from the target network element. However, in the prior art, a correspondence between external identity information and intra-network identity information in a communications network is recorded in an HSS through subscription, and consequently the subscription process is complex, and a large amount of data is to be maintained. In the method in this embodiment of this application, the correspondence between the external identity information and the intra-network identity information is dynamically established, so as to reduce correspondence establishment complexity and reduce load of the HSS compared with the prior art.

Figure 9:
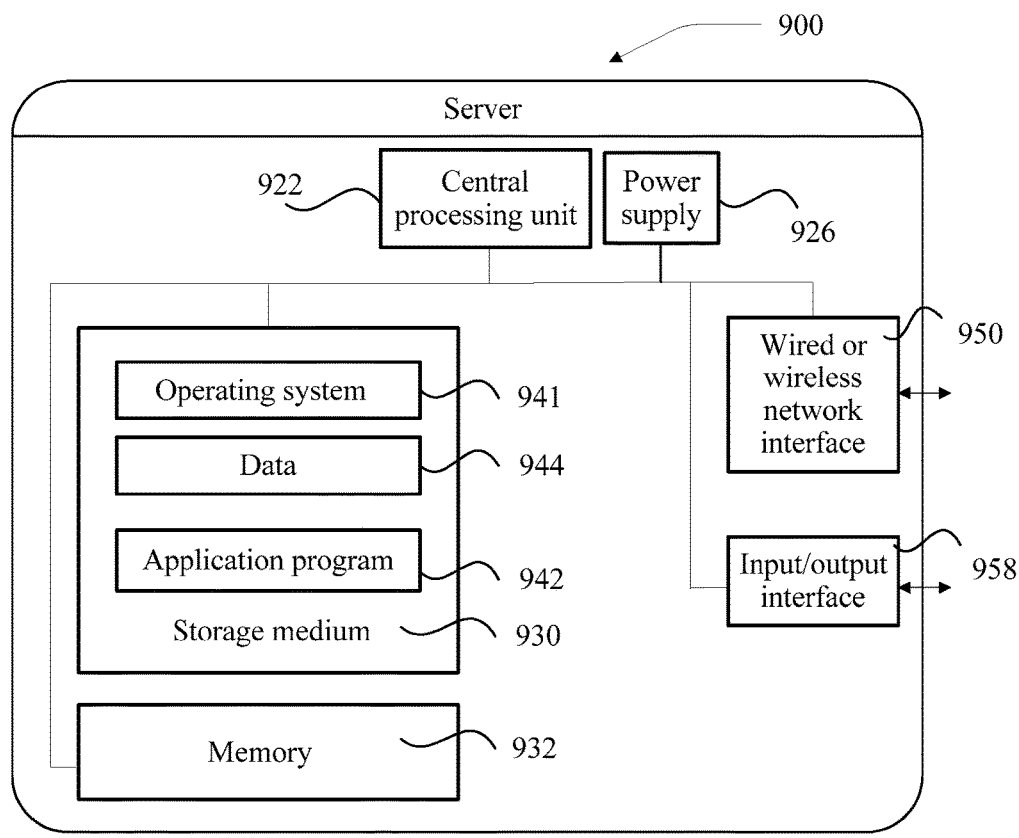
FIG. 9 is a schematic structural diagram of hardware of a database control system according to an embodiment of this application.

FIG. 9 shows a database control system according to another embodiment of this application, specifically including: The database control system 900 may greatly vary with configuration or performance, and may include one or more central processing units (central processing unit, CPU) 922 (for example, one or more processors), a memory 1932, and one or more storage media 930 (for example, one or more mass storage devices) storing an application program 942 or data 944. The memory 932 and the storage medium 930 may perform temporary storage or permanent storage. The program stored in the storage medium 930 may include one or more modules (which are not shown in the figure), and each module may include a series of instruction operations in the database control system. Further, the central processing unit 922 may be configured to communicate with the storage medium 930, and perform, in the database control system 900, the series of instruction operations in the storage medium 930.

The database control system 900 may further include one or more power supplies 926, one or more wired or wireless network interfaces 950, one or more input/output interfaces 958, and/or one or more operating systems 941, for example, Windows Server™, Mac OS X™, UNIX™, Linux™, and FreeBSD™.

The steps performed by the database control system in the foregoing embodiments may be based on the structure of the database control system shown in FIG. 9. Functions of the database control system shown in FIG. 7 may be implemented based on the hardware structure of the database control system shown in FIG. 9.

Details are as follows:

The central processing unit 922 specifically has the following functions: receiving registration information sent by a third-party application server, where the registration information includes an IP address of UE and external identity information of the UE, and the external identity information is allocated by the third-party application server to the UE; sending the IP address to a target network element; receiving intra-network identity information of the UE that is returned by the target network element based on the IP address; and establishing a correspondence between the external identity information and the intra-network identity information.

Optionally, the target network element includes a PGW, and the intra-network identity information includes an IMSI/MSISDN.

Optionally, based on the foregoing method, the central processing unit 922 specifically has the following functions: a first receiving unit, receiving external identity information sent by a preset network element; determining, based on the correspondence between the external identity information and the intra-network identity information, an IMSI/MSISDN corresponding to the external identity information sent by the preset network element; and sending the determined IMSI/MSISDN to the preset network element.

Optionally, the preset network element includes an HSS or an SCEF.

Optionally, the target network element includes a MEC, the IP address is a public IP address, and the intra-network identity information includes a private IP address.

Optionally, the central processing unit 922 specifically further has the following functions: receiving a deletion request sent by the third-party application server, where the deletion request is sent by the third-party application server when a terminal corresponding to the private IP address exits the third-party application server; and deleting the correspondence between the external identity information and the intra-network identity information according to the deletion request. In this embodiment, the central processing unit 922 may obtain the registration information that is sent by the third-party application server and that includes the IP address and the external identity information that are corresponding to each other, and the external identity information is allocated by the third-party application server to the end user. The central processing unit 922 sends the IP address to the target network element, so that after the target network element obtains the intra-network identity information based on the IP address, the central processing unit 922 obtains the intra-network identity information from the target network element. The central processing unit 922 may establish the correspondence between the external identity information and the intra-network identity information. In this way, the database control system may establish the correspondence between the external identity information and the intra-network identity information by obtaining the external identity information from the third-party application server and obtaining the intra-network identity information from the target network element. However, in the prior art, a correspondence between external identity information and intra-network identity information in a communications network is recorded in an HSS through subscription, and consequently the subscription process is complex, and a large amount of data is to be maintained. In the method in this embodiment of this application, the correspondence between the external identity information and the intra-network identity information is dynamically established, so as to reduce correspondence establishment complexity compared with the prior art.

Figure 10:
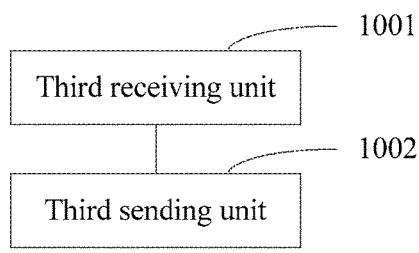
FIG. 10 is a schematic structural diagram of a service capability exposure function according to an embodiment of this application.

Specifically, FIG. 10 shows a service capability exposure function according to an embodiment of this application. FIG. 10 is a schematic structural diagram of a service capability exposure function. The service capability exposure function shown in FIG. 10 may be configured to implement functions of the service capability exposure function in the foregoing embodiments, and the service capability exposure function specifically includes a third receiving unit 1001 and a third sending unit 1002.

The third receiving unit 1001 is configured to receive a first monitoring request sent by a third-party application server, and the first monitoring request includes external identity information and monitoring type information.

The third sending unit 1002 is configured to send the external identity information to a database control system.

The third receiving unit 1001 is further configured to receive intra-network identity information sent by the database control system, and the intra-network identity information is obtained by the database control system from a pre-established correspondence between the external identity information and the intra-network identity information based on the external identity information sent by the SCEF.

The third sending unit 1002 is further configured to send a second monitoring request to an HSS, and the second monitoring request includes the intra-network identity information and the monitoring type information.

Optionally, the intra-network identity information includes an IMSI or an MSISDN. In this embodiment, when the third-party application server initiates the monitoring request to the third receiving unit 1001, the third sending unit 1002 sends the external identity information to the database control system. After the database control system obtains the intra-network identity information from the pre-established correspondence between the external identity information and the intra-network identity information, the third receiving unit 1001 receives the intra-network identity information IMSI/MSISDN sent by the database control system. The third sending unit 1002 sends the IMSI/MSISDN and the monitoring type information to the HSS, so that the HSS can determine a corresponding MME based on the IMSI/MSISDN, and request, from the MME, a monitoring event corresponding to the monitoring type information. The SCEF may obtain the IMSI/MSISDN from the database control system. However, in the prior art, the SCEF obtains the IMSI/MSISDN from subscription data of the HSS.

Further, there is another embodiment of the service capability exposure function SCEF in this embodiment of this application. Referring to the hardware structure of the database control system shown in FIG. 9, the SCEF also has a hardware structure similar to the hardware structure of the database control system shown in FIG. 9. To be specific, the SCEF specifically includes: The SCEF may greatly vary with configuration or performance, and may include one or more central processing units (central processing unit, CPU) 922 (for example, one or more processors), a memory, and one or more storage media (for example, one or more mass storage devices) storing an application program or data. The memory and the storage medium may perform temporary storage or permanent storage. The program stored in the storage medium may include one or more modules (which are not shown in the figure), and each module may include a series of instruction operations in the database control system. Further, the central processing unit may be configured to communicate with the storage medium, and perform, in the SCEF, the series of instruction operations in the storage medium.

The SCEF may further include one or more power supplies, one or more wired or wireless network interfaces, one or more input/output interfaces, and/or one or more operating systems, for example, Windows Server™, Mac OS X™, UNIX™, Linux™, and FreeBSD™.

The steps performed by the SCEF in the foregoing embodiments may be based on the SCEF having the structure shown in FIG. 9. Functions of the SCEF shown in FIG. 10 may be implemented based on the hardware structure of the SCEF in this embodiment of this application. Details are as follows:

The central processing unit of the SCEF has the following functions:

receiving a first monitoring request sent by a third-party application server, where the first monitoring request includes external identity information and monitoring type information; sending the external identity information to a database control system; receiving intra-network identity information sent by the database control system, where the intra-network identity information is obtained by the database control system from a pre-established correspondence between the external identity information and the intra-network identity information based on the external identity information sent by the SCEF; and sending a second monitoring request to an HSS, where the second monitoring request includes the intra-network identity information and the monitoring type information.

Optionally, the intra-network identity information includes an IMSI or an MSISDN.

In this embodiment, the central processing unit of the SCEF sends the external identity information to the database control system to obtain the intra-network identity information IMSI/MSISDN from the database control system, and sends the IMSI/MSISDN and the monitoring type information to the HSS, so that the HSS can determine a corresponding MME based on the IMSI/MSISDN, and request, from the MME, a monitoring event corresponding to the monitoring type information. The database control system pre-establishes the correspondence between the external identity information and the intra-network identity information. The SCEF may obtain the IMSI/MSISDN from the database control system. However, in the prior art, the SCEF obtains the IMSI/MSISDN from subscription data of the HSS.

Figure 11:
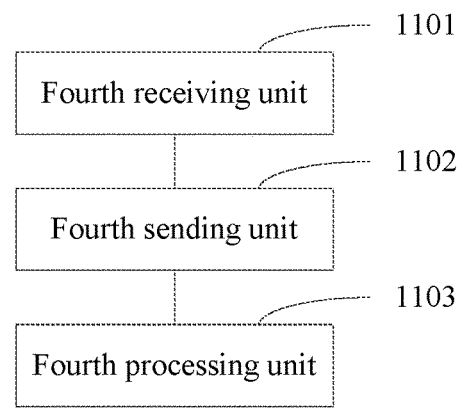
FIG. 11 is a schematic structural diagram of a home subscriber server according to an embodiment of this application.

Specifically, FIG. 11 shows a home subscriber server according to an embodiment of this application. FIG. 11 is a schematic structural diagram of an HSS. The HSS shown in FIG. 11 may be configured to implement functions of the HSS in the foregoing embodiments, and the HSS specifically includes a fourth receiving unit 1101, a fourth sending unit 1102, and a fourth processing unit 1103.

The fourth receiving unit 1101 is configured to receive external identity information and monitoring type information that are sent by an SCEF.

The fourth sending unit 1102 is configured to send the external identity information to a database control system.

The fourth receiving unit 1101 is further configured to receive intra-network identity information sent by the database control system. The intra-network identity information is obtained by the database control system from a pre-established correspondence between the external identity information and the intra-network identity information based on the external identity information sent by the HSS.

The fourth processing unit 1103 is configured to determine an MME based on the intra-network identity information.

The fourth sending unit 1102 is configured to request, from the MME, monitoring event information corresponding to the monitoring type information.

Optionally, the intra-network identity information includes an IMSI or an MSISDN. In conclusion, in this embodiment of this application, after the fourth receiving unit 1101 obtains the external identity information and the monitoring type information, the fourth sending unit 1102 may send the external identity information to the database control system that pre-establishes the correspondence between the external identity information and the intra-network identity information, so that the database control system returns the corresponding intra-network identity information IMSI/MSISDN. After the fourth receiving unit 1101 obtains the intra-network identity information from the database control system, the fourth processing unit 1103 determines the MME based on the IMSI/MSISDN, and the fourth sending unit 1102 initiates, to the MME, the monitoring request corresponding to the monitoring type. The HSS may obtain the IMSI/MSISDN from the database control system. However, in the prior art, the HSS obtains the IMSI/MSISDN from subscription data of the HSS.

Further, there is another embodiment of the home subscriber server in this embodiment of this application. Referring to the hardware structure of the database control system shown in FIG. 9, the home subscriber server also has a hardware structure similar to the hardware structure of the database control system shown in FIG. 9. To be specific, the HSS specifically includes: The HSS may greatly vary with configuration or performance, and may include one or more central processing units (central processing unit, CPU) 922 (for example, one or more processors), a memory, and one or more storage media (for example, one or more mass storage devices) storing an application program or data. The memory and the storage medium may perform temporary storage or permanent storage. The program stored in the storage medium may include one or more modules (which are not shown in the figure), and each module may include a series of instruction operations in the database control system. Further, the central processing unit may be configured to communicate with the storage medium, and perform, in the HSS, the series of instruction operations in the storage medium.

The HSS may further include one or more power supplies, one or more wired or wireless network interfaces, one or more input/output interfaces, and/or one or more operating systems, for example, Windows Server™, Mac OS X™, UNIX™, Linux™, and FreeBSD™.

The steps performed by the HS S in the foregoing embodiments may be based on the structure of the HSS. Function of the HSS shown in FIG. 11 may be implemented based on the hardware structure of the HSS in this embodiment of this application.

Details are as follows:

The central processing unit of the HSS has the following functions: receiving external identity information and monitoring type information that are sent by an SCEF; sending the external identity information to a database control system; receiving intra-network identity information sent by the database control system, where the intra-network identity information is obtained by the database control system from a pre-established correspondence between the external identity information and the intra-network identity information based on the external identity information sent by the HSS; determining an MME based on the intra-network identity information; and requesting, from the MME, monitoring event information corresponding to the monitoring type information.

Optionally, the intra-network identity information includes an IMSI or an MSISDN.

In this embodiment, after obtaining the external identity information and the monitoring type information, the central processing unit of the HSS may send the external identity information to the database control system that pre-establishes the correspondence between the external identity information and the intra-network identity information, so that the database control system returns the corresponding intra-network identity information IMSI/MSISDN. After obtaining the intra-network identity information from the database control system, the central processing unit of the HSS determines the MME based on the IMSI/MSISDN, and initiates, to the MME, the monitoring request corresponding to the monitoring type information. The HSS may obtain the IMSI/MSISDN from the database control system. However, in the prior art, the HSS obtains the IMSI/MSISDN from subscription data of the HSS.

Figure 12:
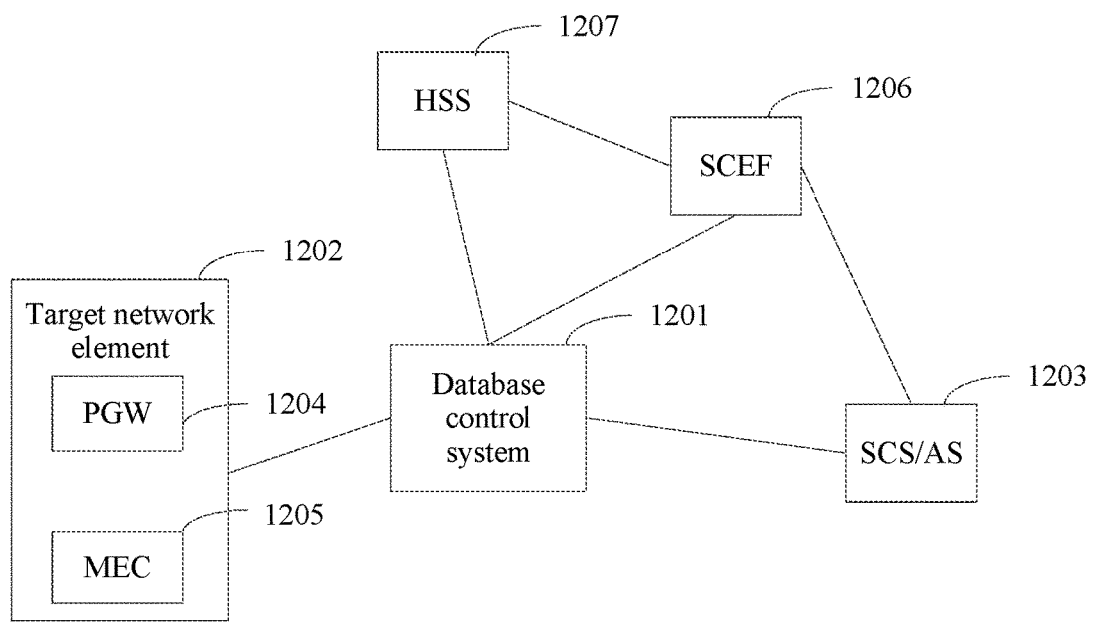
FIG. 12 is a network architecture diagram of a communications system according to an embodiment of this application.

FIG. 12 is a network architecture diagram of a communications system according to an embodiment of this application. The communications system includes a database control system 1201, a target network element 1202, and a third-party application server 1203.

The database control system is the database control system in any one of the embodiments shown in FIG. 2 to FIG. 7, and FIG. 9. For details, refer to the foregoing example embodiments. Details are not described herein again.

Optionally, the target network element includes a PGW 1204 or a MEC 1205.

Optionally, the communications system further includes a service capability exposure function SCEF 1206 and a home subscriber server HSS 1207.

The service capability exposure function is the service capability exposure function in any one of the embodiments shown in FIG. 2, FIG. 3, and FIG. 10. For details, refer to the foregoing example embodiments. Details are not described herein again.

The home subscriber server is the home subscriber server in any one of the embodiments shown in FIG. 2, FIG. 4, and FIG. 11. For details, refer to the foregoing example embodiments. Details are not described herein again.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a database control system, a network device, or the like) to perform all or a part of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An identity information processing method, comprising:
   receiving, by a database control system, registration information sent by a third-party application server, wherein the registration information comprises an Internet Protocol (IP) address of user equipment (UE) and external identity information of the UE, and wherein the external identity information is allocated by the third-party application server to the UE;
   sending, by the database control system, the IP address to a target network element, wherein the target network element comprises a Mobile Edge Computing (MEC), wherein the IP address is a public IP address, and wherein the intra-network identity information comprises a private IP address;
   receiving, by the database control system, intra-network identity information of the UE that is returned by the target network element based on the IP address; and
   establishing, by the database control system, a correspondence between the external identity information and the intra-network identity information.

2. The method according to claim 1, wherein the target network element comprises a packet data network gateway (PGW), and wherein the intra-network identity information comprises an international mobile subscriber identity (IMSI) or a mobile subscriber international ISDN number MSISDN.

3. The method according to claim 2, wherein
   when the IP address is a public IP address, the method further comprises:
      receiving, by the PGW, the public IP address sent by the database control system;
      obtaining, by the PGW, a private IP address based on the public IP address;
      obtaining, by the PGW, the IMSI or MSISDN based on the private IP address; and
      sending, by the PGW, the IMSI or MSISDN to the database control system; or
   when the IP address is a private IP address, the method further comprises:
      receiving, by the PGW, the private IP address sent by the database control system;
      obtaining, by the PGW, the IMSI or MSISDN based on the private IP address; and
      sending, by the PGW, the IMSI or MSISDN to the database control system.

4. The method according to claim 1, wherein the method further comprises:
   receiving, by the database control system, a deletion request sent by the third-party application server, wherein the deletion request is sent by the third-party application server when a terminal corresponding to the private IP address exits the third-party application server; and
   deleting, by the database control system, the correspondence between the external identity information and the intra-network identity information according to the deletion request.

5. The method according to claim 1, wherein after the establishing, by the database control system, a correspondence between the external identity information and the intra-network identity information, the method further comprises:
   receiving, by the database control system, external identity information sent by a preset network element;

determining, by the database control system based on the correspondence between the external identity information and the intra-network identity information, intra-network identity information that corresponds to the external identity information sent by the preset network element; and sending, by the database control system, the determined intra-network identity information to the preset network element.

6. The method according to claim 5, wherein the preset network element comprises a home subscriber server (HSS), a service capability exposure function (SCEF), or a Mobile Edge Computing (MEC).

7. A database control system, comprising:
a receiver, the receiver configured to receive registration information sent by a third-party application server, wherein the registration information comprises an Internet Protocol (IP) address of a user equipment (UE) and external identity information of the UE, and wherein the external identity information is allocated by the third-party application server to the UE;

a transmitter, the transmitter configured to send the IP address to a target network element, wherein the target network element comprises a Mobile Edging Computing (MEC), wherein the IP address is a public IP address, wherein the intra-network identity information comprises a private IP address, and wherein the receiver is further configured to receive intra-network identity information of the UE that is returned by the target network element based on the IP address; and at least one processor, the at least one processor configured to establish a correspondence between the external identity information and the intra-network identity information.

8. The database control system according to claim 7, wherein the target network element comprises a packet data network gateway (PGW), and wherein the intra-network identity information comprises an international mobile subscriber identity (IMSI) or a mobile subscriber international ISDN number (MSISDN).

9. The database control system according to claim 7, wherein
the receiver is configured to receive a deletion request sent by the third-party application server, wherein the deletion request is sent by the third-party application server when a terminal corresponding to the private IP address exits the third-party application server; and the at least one processor is configured to delete the correspondence between the external identity information and the intra-network identity information according to the deletion request.

10. The database control system according to claim 7, wherein
the receiver is further configured to receive external identity information sent by a preset network element;

the at least one processor is further configured to determine, based on the correspondence between the external identity information and the intra-network identity information, intra-network identity information that corresponds to the external identity information sent by the preset network element; and the transmitter is further configured to send the determined intra-network identity information to the preset network element.

11. The database control system according to claim 10, wherein the preset network element comprises a home subscriber server (HSS), a service capability exposure function (SCEF), or a Mobile Edge Computing (MEC).

12. A communications system, wherein the communications system comprises a database control system, a target network element, and a third-party application server; and
wherein the database control system is configured to:
receive registration information sent by a third-party application server, wherein the registration information comprises an Internet Protocol (IP) address of user equipment (UE) and external identity information of the UE, and wherein the external identity information is allocated by the third-party application server to the UE;

send the IP address to a target network element, wherein the target network element comprises a Mobile Edge Computing (MEC), wherein the IP address is a public IP address, and wherein the intra-network identity information comprises a private IP address;

receive intra-network identity information of the UE that is returned by the target network element based on the IP address; and establish a correspondence between the external identity information and the intra-network identity information.

* * * * *

UNITED STATES PATENT AND TRADEMARK OFFICE
CERTIFICATE OF CORRECTION

PATENT NO. : 10,470,017 B2  
APPLICATION NO. : 16/291521  
DATED : November 5, 2019  
INVENTOR(S) : Lu et al.

It is certified that error appears in the above-identified patent and that said Letters Patent is hereby corrected as shown below:

On the Title Page

Column 2, Line 1, under item (56), delete "V135.0" and insert -- V13.5.0 --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*